(12) United States Patent
van Beek

(10) Patent No.: US 7,706,384 B2
(45) Date of Patent: Apr. 27, 2010

(54) PACKET SCHEDULING WITH QUALITY-AWARE FRAME DROPPING FOR VIDEO STREAMING

(75) Inventor: Petrus J. L. van Beek, Camas, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 339 days.

(21) Appl. No.: 11/738,313

(22) Filed: Apr. 20, 2007

(65) Prior Publication Data

US 2008/0259799 A1    Oct. 23, 2008

(51) Int. Cl.
*H04L 12/28* (2006.01)
(52) U.S. Cl. .................................. 370/395.4; 709/102
(58) Field of Classification Search ............... 370/255, 370/395.4, 395.21, 395.41, 428, 235, 299, 370/230, 429, 363, 368, 371, 374, 378, 381, 370/389; 709/102, 231; 309/236, 238
See application file for complete search history.

(56) References Cited

U.S. PATENT DOCUMENTS

| | | | |
|---|---|---|---|
| 5,392,280 A * | 2/1995 | Zheng | .................. 370/353 |
| 6,031,584 A | 2/2000 | Gray | |
| 6,498,865 B1 | 12/2002 | Brailean et al. | |
| 6,747,991 B1 | 6/2004 | Hemy et al. | |
| 2003/0233464 A1 | 12/2003 | Walpole et al. | |
| 2004/0194142 A1 | 9/2004 | Jiang et al. | |
| 2005/0071876 A1 | 3/2005 | van Beek | |
| 2005/0169312 A1 | 8/2005 | Cakareski et al. | |
| 2006/0026294 A1 | 2/2006 | Virdi et al. | |
| 2006/0095943 A1 | 5/2006 | Demircin et al. | |
| 2006/0095944 A1 | 5/2006 | Demircin et al. | |
| 2006/0153217 A1 | 7/2006 | Chu et al. | |
| 2006/0164987 A1 | 7/2006 | Ruiz Floriach et al. | |
| 2007/0058557 A1 * | 3/2007 | Cuffaro et al. | .............. 370/252 |

FOREIGN PATENT DOCUMENTS

| | | |
|---|---|---|
| EP | 1 619 839 A1 | 1/2006 |
| WO | WO 03/041055 A1 | 5/2003 |
| WO | WO 2004/010250 A2 | 1/2004 |
| WO | WO 2006/061801 A1 | 6/2006 |
| WO | WO 2006/064454 A1 | 6/2006 |
| WO | WO 2006/067374 A1 | 6/2006 |

OTHER PUBLICATIONS

Kalman,Mark,Girod,Bernd: Van Beek, Peter,"Optimized Transcoding Rate Selection and Packet scheduling for Transmitting Multiple Video Streams Over a Shared Channel,"ICIP 2005.

(Continued)

*Primary Examiner*—Brenda Pham
(74) *Attorney, Agent, or Firm*—Michael Blaine Brooks, PC; Rosemarie F. Jones; Michael B. Brooks

(57) ABSTRACT

The embodiments of the invention relate to video streaming, particularly to quality-aware adaptive and selective transmissions. The embodiments of the present invention provide for a set of scheduling patterns to be evaluated, and from such set determine the target scheduling pattern that is calculated to provide the least distortion increment based on the evaluation set.

28 Claims, 20 Drawing Sheets

OTHER PUBLICATIONS

Chakareski, Jacob; Apostolopoulos, John; Girod, Bernd, "Low-Complexity Rate-Distortion Optimized Video Streaming," IEEE ICIP, Oct. 2004, Singapore.

Kalman, M., Steinbach, E., & Girod, B., "Adaptive Media Playout for Low-Delay Video Streaming Over Error-Prone Channels," IEEE Transactions, Jun. 2004, pp. 841-851, vol. 14, No. 6.

Sehgal, Anshul, Verscheure, Olivier and Frossard, Pascal, "Distortion-Buffer Optimized TCP Video Streaming," IEEE ICP, Oct. 2004, Singapore.

Sehgal, Anshul, Jagmohan, Ashish, Verscheure, Olivier and Frossard, Pascal, "Fast Distortion-Buffer Optimized Streaming of Multimedia," IEEE ICP, Sep. 2005, Genoa, Italy.

Chou, Philip A., Miao, Zhourong, "Rate-Distortion Optimized Steaming of Packetized Media," Technical Report MSR-TR-2001-35, Feb. 2001, Microsoft Research, Redding, CA.

* cited by examiner

FIG. 8A

| I | B | B | B | B | B | B | B | B | B | B | B | B | B | B | B | B | B | B | B | B | B | B | B | B | B | B | B | B | B | B | B | B | B | B | B | B | B | B | B | B | B | P | B | I |
|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|
| 0 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |

FIG. 8B

| | I | B | B | P | B | B | B | B | B | B | B | B | B | B | B | B | B | B | B | B | B | B | B | B | B | B | B | B | B | B | B | B | B | B | B | B | B | B | B | B | B | B | P | B | I |
|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|
| 1 | 1 | 0 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| 2 | 1 | 0 | 0 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| 3 | 1 | 0 | 0 | 0 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| 4 | 1 | 0 | 0 | 0 | 0 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| 5 | 1 | 0 | 0 | 0 | 0 | 0 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| 6 | 1 | 0 | 0 | 0 | 0 | 0 | 0 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| 7 | 1 | 0 | 0 | 0 | 0 | 0 | 0 | 0 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| 8 | 1 | 0 | 0 | 0 | 0 | 0 | 0 | 0 | 0 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| 9 | 1 | 0 | 0 | 0 | 0 | 0 | 0 | 0 | 0 | 0 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| 10 | 1 | 0 | 0 | 0 | 0 | 0 | 0 | 0 | 0 | 0 | 0 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |

FIG. 8C

| | 11 | 12 | 13 | 14 | 15 | 16 | 17 | 18 | 19 | 20 |
|---|---|---|---|---|---|---|---|---|---|---|
| I | 1 | 1 | 1 | 1 | 1 | 1 | 1 | 1 | 1 | 1 |
| B | 1 | 1 | 1 | 1 | 1 | 1 | 1 | 1 | 1 | 0 |
| B | 1 | 1 | 1 | 1 | 1 | 1 | 1 | 1 | 0 | 0 |
| P | 1 | 1 | 1 | 1 | 1 | 1 | 1 | 1 | 1 | 1 |
| B | 1 | 1 | 1 | 1 | 1 | 1 | 1 | 0 | 0 | 0 |
| B | 1 | 1 | 1 | 1 | 1 | 1 | 0 | 0 | 0 | 0 |
| P | 1 | 1 | 1 | 1 | 1 | 1 | 1 | 1 | 1 | 1 |
| B | 1 | 1 | 1 | 1 | 1 | 0 | 0 | 0 | 0 | 0 |
| B | 1 | 1 | 1 | 1 | 0 | 0 | 0 | 0 | 0 | 0 |
| P | 1 | 1 | 1 | 1 | 1 | 1 | 1 | 1 | 1 | 1 |
| B | 1 | 1 | 1 | 0 | 0 | 0 | 0 | 0 | 0 | 0 |
| B | 1 | 1 | 0 | 0 | 0 | 0 | 0 | 0 | 0 | 0 |
| P | 1 | 1 | 1 | 1 | 1 | 1 | 1 | 1 | 1 | 1 |
| B | 1 | 0 | 0 | 0 | 0 | 0 | 0 | 0 | 0 | 0 |
| B | 0 | 0 | 0 | 0 | 0 | 0 | 0 | 0 | 0 | 0 |
| I | 1 | 1 | 1 | 1 | 1 | 1 | 1 | 1 | 1 | 1 |
| B | 0 | 0 | 0 | 0 | 0 | 0 | 0 | 0 | 0 | 0 |
| B | 0 | 0 | 0 | 0 | 0 | 0 | 0 | 0 | 0 | 0 |
| P | 1 | 1 | 1 | 1 | 1 | 1 | 1 | 1 | 1 | 1 |
| B | 0 | 0 | 0 | 0 | 0 | 0 | 0 | 0 | 0 | 0 |
| B | 0 | 0 | 0 | 0 | 0 | 0 | 0 | 0 | 0 | 0 |
| P | 1 | 1 | 1 | 1 | 1 | 1 | 1 | 1 | 1 | 1 |
| B | 0 | 0 | 0 | 0 | 0 | 0 | 0 | 0 | 0 | 0 |
| I | 0 | 0 | 0 | 0 | 0 | 0 | 0 | 0 | 0 | 0 |
| B | 0 | 0 | 0 | 0 | 0 | 0 | 0 | 0 | 0 | 0 |
| P | 1 | 1 | 1 | 1 | 1 | 1 | 1 | 1 | 1 | 1 |
| B | 0 | 0 | 0 | 0 | 0 | 0 | 0 | 0 | 0 | 0 |
| B | 0 | 0 | 0 | 0 | 0 | 0 | 0 | 0 | 0 | 0 |
| P | 1 | 1 | 1 | 1 | 1 | 1 | 1 | 1 | 1 | 1 |
| I | 1 | 1 | 1 | 1 | 1 | 1 | 1 | 1 | 1 | 1 |

FIG. 8D

| | 31 | 32 | 33 | 34 | 35 | 36 | 37 | 38 | 39 |
|---|---|---|---|---|---|---|---|---|---|
| I | 1 | 1 | 1 | 1 | 1 | 1 | 1 | 1 | 1 |
| B | 1 | 1 | 1 | 1 | 1 | 1 | 1 | 1 | 1 |
| B | 1 | 1 | 1 | 1 | 1 | 1 | 1 | 1 | 0 |
| P | 1 | 1 | 1 | 1 | 1 | 1 | 1 | 1 | 1 |
| B | 1 | 1 | 1 | 1 | 1 | 1 | 1 | 1 | 1 |
| B | 1 | 1 | 1 | 1 | 1 | 1 | 1 | 0 | 0 |
| P | 1 | 1 | 1 | 1 | 1 | 1 | 1 | 1 | 1 |
| B | 1 | 1 | 1 | 1 | 1 | 1 | 1 | 1 | 1 |
| B | 1 | 1 | 1 | 1 | 1 | 1 | 0 | 0 | 0 |
| P | 1 | 1 | 1 | 1 | 1 | 1 | 1 | 1 | 1 |
| B | 1 | 1 | 1 | 1 | 1 | 0 | 0 | 0 | 0 |
| P | 1 | 1 | 1 | 1 | 1 | 1 | 1 | 1 | 1 |
| B | 1 | 1 | 1 | 1 | 1 | 1 | 1 | 1 | 1 |
| B | 1 | 1 | 1 | 1 | 0 | 0 | 0 | 0 | 0 |
| I | 1 | 1 | 1 | 1 | 1 | 1 | 1 | 1 | 1 |
| B | 1 | 1 | 1 | 1 | 1 | 1 | 1 | 1 | 1 |
| B | 1 | 1 | 1 | 0 | 0 | 0 | 0 | 0 | 0 |
| P | 1 | 1 | 1 | 1 | 1 | 1 | 1 | 1 | 1 |
| B | 1 | 1 | 0 | 0 | 0 | 0 | 0 | 0 | 0 |
| P | 1 | 1 | 1 | 1 | 1 | 1 | 1 | 1 | 1 |
| B | 1 | 0 | 0 | 0 | 0 | 0 | 0 | 0 | 0 |
| P | 1 | 1 | 1 | 1 | 1 | 1 | 1 | 1 | 1 |
| B | 0 | 0 | 0 | 0 | 0 | 0 | 0 | 0 | 0 |
| B | 1 | 1 | 1 | 1 | 1 | 1 | 1 | 1 | 1 |
| I | 1 | 1 | 1 | 1 | 1 | 1 | 1 | 1 | 1 |

FIG. 8E

| | 40 | 41 | 42 | 43 | 44 | 45 | 46 | 47 | 48 |
|---|---|---|---|---|---|---|---|---|---|
| I | 1 | 1 | 1 | 1 | 1 | 1 | 1 | 1 | 1 |
| B | 1 | 1 | 1 | 1 | 1 | 1 | 1 | 1 | 0 |
| B | 1 | 1 | 1 | 1 | 1 | 1 | 1 | 1 | 1 |
| P | 1 | 1 | 1 | 1 | 1 | 1 | 1 | 1 | 1 |
| B | 1 | 1 | 1 | 1 | 1 | 1 | 1 | 0 | 0 |
| B | 1 | 1 | 1 | 1 | 1 | 1 | 1 | 1 | 1 |
| P | 1 | 1 | 1 | 1 | 1 | 1 | 1 | 1 | 1 |
| B | 1 | 1 | 1 | 1 | 1 | 1 | 0 | 0 | 0 |
| B | 1 | 1 | 1 | 1 | 1 | 1 | 1 | 1 | 1 |
| P | 1 | 1 | 1 | 1 | 1 | 1 | 1 | 1 | 1 |
| B | 1 | 1 | 1 | 1 | 1 | 0 | 0 | 0 | 0 |
| B | 1 | 1 | 1 | 1 | 1 | 1 | 1 | 1 | 1 |
| P | 1 | 1 | 1 | 1 | 1 | 1 | 1 | 1 | 1 |
| B | 1 | 1 | 1 | 1 | 0 | 0 | 0 | 0 | 0 |
| B | 1 | 1 | 1 | 1 | 1 | 1 | 1 | 1 | 1 |
| I | 1 | 1 | 1 | 1 | 1 | 1 | 1 | 1 | 1 |
| B | 1 | 1 | 1 | 0 | 0 | 0 | 0 | 0 | 0 |
| B | 1 | 1 | 1 | 1 | 1 | 1 | 1 | 1 | 1 |
| P | 1 | 1 | 1 | 1 | 1 | 1 | 1 | 1 | 1 |
| B | 1 | 1 | 0 | 0 | 0 | 0 | 0 | 0 | 0 |
| B | 1 | 1 | 1 | 1 | 1 | 1 | 1 | 1 | 1 |
| P | 1 | 1 | 1 | 1 | 1 | 1 | 1 | 1 | 1 |
| B | 1 | 0 | 0 | 0 | 0 | 0 | 0 | 0 | 0 |
| B | 1 | 1 | 1 | 1 | 1 | 1 | 1 | 1 | 1 |
| P | 1 | 1 | 1 | 1 | 1 | 1 | 1 | 1 | 1 |
| B | 0 | 0 | 0 | 0 | 0 | 0 | 0 | 0 | 0 |
| B | 1 | 1 | 1 | 1 | 1 | 1 | 1 | 1 | 1 |
| P | 1 | 1 | 1 | 1 | 1 | 1 | 1 | 1 | 1 |
| B | 0 | 0 | 0 | 0 | 0 | 0 | 0 | 0 | 0 |
| B | 1 | 1 | 1 | 1 | 1 | 1 | 1 | 1 | 1 |
| I | 1 | 1 | 1 | 1 | 1 | 1 | 1 | 1 | 1 |

PACKET SCHEDULING WITH QUALITY-AWARE FRAME DROPPING FOR VIDEO STREAMING

CROSS-REFERENCE TO RELATED APPLICATIONS

This application is related to co-pending applications with U.S. patent application Ser. No. 11/560,457 filed Nov. 16, 2006, entitled "Content-Aware Adaptive Packet Transmission," U.S. patent application Ser. No. 10/676,941 filed Sep. 30, 2003, entitled "Wireless Video Transmission System," U.S. patent application Ser. No. 11/113,001 filed Apr. 21, 2005, entitled "Sender-side Bandwidth Estimation for Video Transmission with Receiver Packet Buffer," which claims the priority of U.S. Provisional Patent Application 60/623,362 filed on Oct. 30, 2004, entitled "Sender-side Bandwidth Estimation for Video Transmission with Receiver Packet Buffer," and U.S. patent application Ser. No. 11/113,000 filed on Apr. 21, 2005, entitled "Method for Providing Interactive Television Programming," which are hereby incorporated by reference herein in their entirety including all appendixes, if any, for all purposes.

FIELD OF THE INVENTION

The embodiments of the present invention relate to streaming data, particularly to adaptive transmission scheduling and source data pruning.

BACKGROUND

With the proliferation of digital data, various source contents have been expected to come from various sources and various delivery mediums, including wide area networks, local area networks, broadcasts, cable, and wireless networks. A multimedia stream, however, may be transmitted, for example, over network segments with varying link capacities. Ways of dynamically adapting a multimedia stream to varying network conditions are thus highly desirable for efficient transmission of the multimedia stream.

SUMMARY

In one aspect, a method of transmitting, between a sender and a receiver, a data stream comprising a plurality of data units in a transmission buffer at the sender is provided. The plurality of data units comprises a first data unit at the front of the transmission buffer and other data units following the first data unit. The method comprises the steps of applying a set of evaluation patterns based on at least one pattern-selection rule, wherein the set of evaluation patterns comprises one or more scheduling patterns with each scheduling pattern comprising a plurality of scheduling decisions, each decision associated with a data unit from the plurality of data units in the transmission buffer, and wherein each scheduling decision indicates whether the associated data unit is evaluated for transmission or dropping; calculating a distortion increase value for each scheduling pattern from the set of evaluation patterns; determining a target scheduling pattern based on a least calculated distortion value among the calculated distortion increase values from each scheduling pattern from the set of evaluation patterns; and processing the first data unit in the transmission buffer for transmission or dropping based on the decision associated with the first data unit from the determined target scheduling pattern.

In another aspect, a device adapted to be operably connected to a network is provided. The device includes a transmission buffer, a pattern module, a distortion module, and a target pattern determinator module. The transmission buffer includes a data stream, wherein the data stream comprises a plurality of data units, and wherein the plurality of data units comprises a first data unit at the front of the buffer and other data units following the first data unit. The pattern module is adapted to apply a set of evaluation patterns based on at least one pattern-selection rule, wherein the set of evaluation patterns comprises one or more scheduling patterns with each scheduling pattern comprising a plurality of scheduling decisions, each decision associated with a data unit from the plurality of data units in the transmission buffer, and wherein each scheduling decision indicates whether the associated data unit is evaluated for transmission or dropping. The distortion module is adapted to calculate a distortion increase value for each scheduling pattern from the set of evaluation patterns. The target pattern determinator module is adapted to determine a target scheduling pattern based on a least calculated distortion value among the calculated distortion increase values from each scheduling pattern from the set of evaluation patterns and to process the first data unit in the transmission buffer for transmission or dropping based on the decision associated with the first data unit from the determined target scheduling pattern.

In another aspect, a system is provided that includes a first device operably coupled to a second device via one or more network segments, the second device, and the one or more network segments. The first device includes a transmission buffer, a pattern module, a distortion module, and a target pattern determinator module. The transmission buffer includes a data stream, wherein the data stream comprises a plurality of data units, and wherein the plurality of data units comprises a first data unit at the front of the buffer and other data units following the first data unit. The pattern module is adapted to apply a set of evaluation patterns based on at least one pattern-selection rule, wherein the set of evaluation patterns comprises one or more scheduling patterns with each scheduling pattern comprising a plurality of scheduling decisions, each decision associated with a data unit from the plurality of data units in the transmission buffer, and wherein each scheduling decision indicates whether the associated data unit is evaluated for transmission or dropping. The distortion module is adapted to calculate a distortion increase value for each scheduling pattern from the set of evaluation patterns. The target pattern determinator module is adapted to determine a target scheduling pattern based on a least calculated distortion value among the calculated distortion increase values from each scheduling pattern from the set of evaluation patterns and to process the first data unit in the transmission buffer for transmission or dropping based on the decision associated with the first data unit from the determined target scheduling pattern. The second device is adapted to receive data units transmitted by the first device, wherein the data units received by the second device include data units from the transmission buffer processed for transmission by the first device.

BRIEF DESCRIPTION OF THE DRAWINGS

The present invention is illustrated by way of example and not limitation in the figures of the accompanying drawings, and in which:

FIGS. 8A-8I show exemplary scheduling patterns indicating a transmission/omission decision for data units in a transmission buffer, according to embodiments of the present invention;

DETAILED DESCRIPTION

Figure 1:
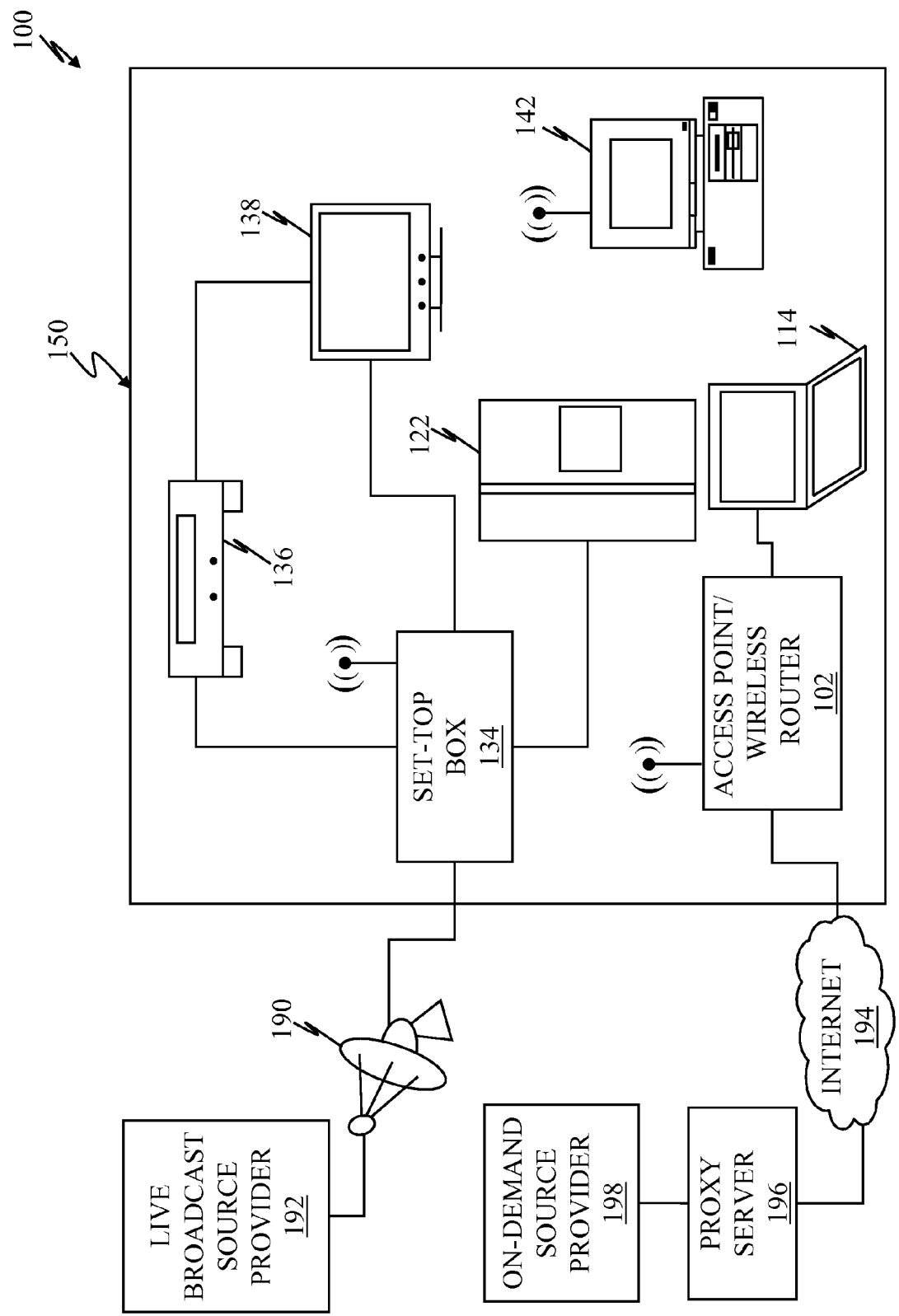
FIG. 1 is a high-level block diagram of a quality-aware adaptive streaming (QASS) system according to an embodiment of the invention.
Figure 2:
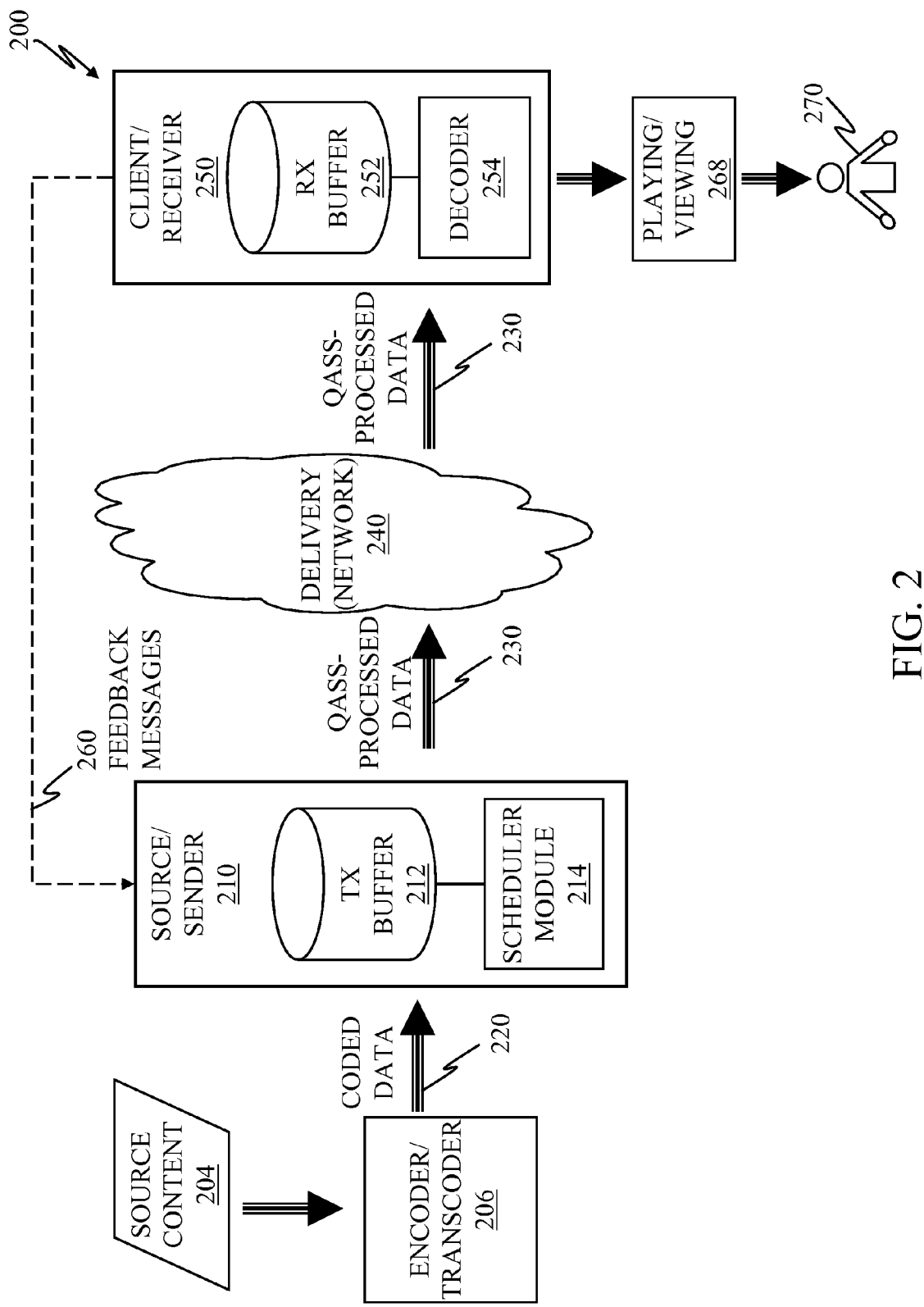
FIG. 2 is a high-level block diagram of another exemplary QASS system, showing a sender and a receiver, according to an embodiment of the invention.

To better understand the figures, reference numerals within the one hundred series, for example, 134 and 190, are initially introduced in FIG. 1, reference numerals in the two hundred series, for example, 212 and 214, are initially introduced in FIG. 2, and so on and so forth.

The embodiments of the present invention generally relate to streaming source content or media, such as audiovisual data, visual data, audio data, and/or control data. Streaming media in general is the transfer of source content so that this content may be received as a continuous real-time stream. Streamed source content elements or data units are typically transmitted by a sender, e.g., a server, source device, server application, or sender entity, and received by a receiver, e.g., client, client application, or receiver entity. The receiver or client typically may start presenting or playing back the source content as soon as the receiving client application has sufficient data units stored in its receiving buffer. The playback or presentation typically continues until the end of the presentation of the source content.

The embodiments of the present invention are adapted to transmit, typically over one or more links or channels, streaming source content or data, which may be pre-stored or live data, from one sender to one or more clients or receivers. One example is streaming video from a media server to one or more television sets in a single home, over wireless segments, e.g., complying with the 802.11 specification. Another example is streaming video from a content delivery service to a receiver in the home, over a broadband access network. Such consumer applications or services typically have transmission of audio and video at high bit rates with low end-to-end delay—i.e., low latency.

The network segments, via which the streaming source contents are transmitted, are typically transmission channels with time-varying channel conditions. For example, the available bandwidth of a wireless link based on the 802.11 specification may vary over time and may be unpredictable due to various conditions, such as varying and unknown distance between the sender and the receiver, radio frequency (RF) interference, fading, collisions with other traffic, network congestion, and other influences. Although adaptation of the bit rate of a source content stream to the channel condition, for example, through transcoding or transrating, may be employed to mitigate the problems of varying network conditions, lag in the control or delay in the response of a transcoder to a change in channel conditions, however, may exist. Furthermore, there may be short-term variations in the sizes of video frames, for example. Moreover, because of varying network conditions and the generally stochastic nature of the network channel, the buffering backlog of the source content to be transmitted by the sender may increase. But because of limited buffer space typically due to low-latency requirements and other consideration, buffer overflow at the sender or buffer underflow at the receiver may occur. The embodiments of the present invention address these challenges, while considering the source content quality presented at the client. In some embodiments, this is handled by a scheduler embodiment of the present invention that determines which source content data units, e.g., frames or packets, at the sender are to be transmitted or dropped, given the typically limited transmission buffer size, channel constraints, and characteristics of the data units, e.g., frames. In some embodiments, heuristic or pattern-selection rules are applied, such that the scheduler of the present invention may discard a frame before transmission at the server, if that frame is estimated such that even if delivered to the client will not be decoded on time at the receiver.

FIG. 1 is an exemplary diagram of a quality-aware adaptive and selective streaming (QASS) system 100 wherein digital source content, such as audio and/or visual/image, data, are transmitted or streamed according to some embodiments of the invention. In this exemplary embodiment, a local network 150 includes a number of consumer electronics, including a set-top box 134, a digital television (DTV) 138, a wireless personal computer (PC) 142, a digital video or versatile disc (DVD) player 136, a computer laptop 114, a gateway/router 102, and a consumer appliance/device 122, connected via various network links or segments. These various consumer electronics are typically adapted to be networked with each other. Examples of consumer appliances that may be networked into the system 100 include televisions and refrigerators with user interfaces, including displays, radios adapted to receive streaming source contents, and any other devices adapted to receive source contents via the network and present them accordingly. The local network 150 comprises various networks—e.g., power line communication (PLC) networks, 802.11a wireless networks, 802.11g wireless networks, 802.11b wireless networks, and Ethernet networks. The local network 150 may be operably coupled to one or more source content providers 192, 198, for example, via satellite, cable, and/or terrestrial broadcast 190 or via an external wide area network, such as the Internet 194. A source content provider 192, 196, 198 may provide pre-encoded and stored source content and/or live or real-time encoded source content to be received by a receiver/client and accordingly be presented in a user interface. For example, a movie may be requested from a source provider 198 that provides on-demand pre-encoded and stored data. The encoded source content is then transmitted and streamed over network segments, which may include wide, local, and/or metropolitan area network segments, which may be wired, wireless, or a combination thereof. This source content is then received by a set-top box 134, for example, via a home wireless network and presented by a digital television 138 and a computer 142. In some embodiments, a source provider or an intermediate network node also has one or more proxy servers 196 that are operably connected to the source provider 198. A proxy server 196 thus may be a node in the system, for example, where source contents may directly or indirectly be requested. Although the receivers or clients of such streaming media content are depicted to be within a local area network, the embodiments of the invention may also apply to other types of receivers, for example, mobile devices adapted to receive and/or present wireless streaming source content. These wireless devices may also be incorporated in vehicles. In some embodiments, not shown, the source content, e.g., a movie, may be transmitted as multiple source content streams, e.g., video streams, with independently varying link capacities sharing resources on a channel or network segment, for example.

FIG. 2 is a high-level block diagram 200 showing another view of an exemplary quality-aware adaptive and selective streaming (QASS) system for the delivery of streaming source content, which may be transmitted over variable bit-rate channels or links. For illustrative purposes, let us assume that a media source provider 192, 198 is providing streaming source content 204 to a consumer 270, which is presented 268 by a receiver 250. The original source content 204 may have been previously captured or captured in real-time. In general, the original source content is captured 204 and then encoded, optionally including transcoding/transrating 206, by an encoder/transcoder module 206. The step of encoding or transcoding 206 typically includes dividing the original source content 204 into one or more components and compressing such components into one or more encoded source content elements or data units 220. The structure, format, and/or data contained in the source content and the data units may depend on the compression technology, e.g., codec or standard being supported. Examples of standards include Moving Picture Expert Group (MPEG) MPEG-2, MPEG-4, H.263, H.264, and Scalable Video Coding (SVC). The encoder/transcoder module 206 and the sender module 210 may be embodied in separate or within the same entities, such as devices or applications.

In some embodiments, coded source content 220 may be transmitted by a source content provider 192, 198, 196 to the sender 210, which may be regarded as a proxy server. The sender 210, functioning as the proxy server, performs the QASS process described herein, prior to transmitting the data units to the client or receiver 250. A sender 210, for example, may be embodied as a media server or a proxy server.

In general, a sender 210 includes a transmission (TX) buffer 212 and a scheduler or scheduling module 214. The TX buffer 212 is typically adapted to store data units to be transmitted to the client. The scheduler module 214 is typically adapted to determine based on the QASS process described herein which data units in the TX buffer 212 are to be transmitted to the client 250 or dropped/omitted at the server 210, for example, so as to match or adjust to a dynamically changing target bandwidth. The scheduler 214 may also be further adapted to perform packet scheduling with quality-aware data unit dropping for video streaming, for example. The scheduler 214 may in general also perform other tasks, including adaptively transmitting or discarding packets, frames, or other data units in the TX buffer 212, retransmitting packets for error control, determining the time of transmissions, and other tasks.

The QASS-processed data 230, which may be a filtered set of TX buffer data, are then transmitted by the sender 210 to the one or more designated clients or receivers 250, for example, via one or more network segments 240-wired, wireless, or both, using a transport protocol, which may include user datagram protocol (UDP), transmission control protocol (TCP), and real-time transport protocol (RTP). That network 240 may be the Internet, a local area network, or a wide area network, for example. The QASS-processed data 230 are then typically received by a receiver (RX) buffer 252 at the receiver 250. The receiver 250 also typically includes a decoder module 254, which then decodes the received QASS-processed data for presentation 268 to a consumer 270. The decoder 254, to appropriately decode the received QASS-processed data 230, typically supports the decompression and codec scheme performed by the encoder/transcoder 206, i.e., adapted to support a common interpretation scheme such that the decoder is able to reconstruct the bit streams into a format that may be used for presentation. The receiver 250, for example, may be embodied as a media player.

In some embodiments, the receiver or client 250 may also generate and transmit feedback messages to the sender 260. These feedback messages may convey various information, which may include channel-condition information such as the number of packets lost, the highest sequence number received, and/or a timestamp that may be used to estimate the round-trip time delay between a the sender and the receiver. These feedback messages 260 may be transmitted as one or more packets, for example. Examples of feedback messages are real time transport control (RTCP) reports, such as RTCP receiver reports or other feedback reports or messages supported by various protocols. In other embodiments, a feedback message may be directly sent at the application layer via UDP or TCP as the transport protocol, i.e., without using RTCP. This application-specific feedback message may comply with an available standard or may be a proprietary/non-standard protocol.

In some embodiments, the scheduler 214 of the present invention may discard less important data units, such as a Moving Picture Experts Group (MPEG) B-frame if this enables a more important frame, such as an MPEG I-frame, supporting coding-dependent frames to be delivered and decoded on time. The scheduler may also be adapted to filter the source content data stream so as to adjust to available bandwidth under a delay constraint, with or without additionally employing transcoding, and to adjust to channel packet losses.

The embodiments of the present invention, particularly via the scheduler, provide algorithms with a low computational complexity while providing estimated enhanced quality at the client. Furthermore, less side-information has to be stored or provided with the source content, or made available to the streaming system in general, as compared to prior art. For example, very little side information about the video sequence of the source content has to be known in order to execute the provided methods herein for quality-optimization.

In some embodiments, not shown, the QASS process is performed at the receiver side 250. In this exemplary embodiment, the coded data 220 is transmitted by the sender, without performing the QASS process, to the receiver 250. The received coded data is typically received and stored in the RX buffer 252. A scheduler module at the receiver side then performs the QASS-process described herein to the coded data stored in the RX buffer 252, prior to the coded data being decoded 254. In this embodiment, the amount of coded data to be decoded is typically less than the amount of coded data transmitted by the sender 210 and stored at the RX buffer 252. Typically, some frames in the RX buffer 252 are dropped prior to decoding. This exemplary embodiment may be beneficial, when the client/receiver 250 has low, minimal, and/or insufficient computational resources. The QASS process performed at the client 250 may also be helpful to speed up processing, and accordingly presentation at the client side.

Figure 3:
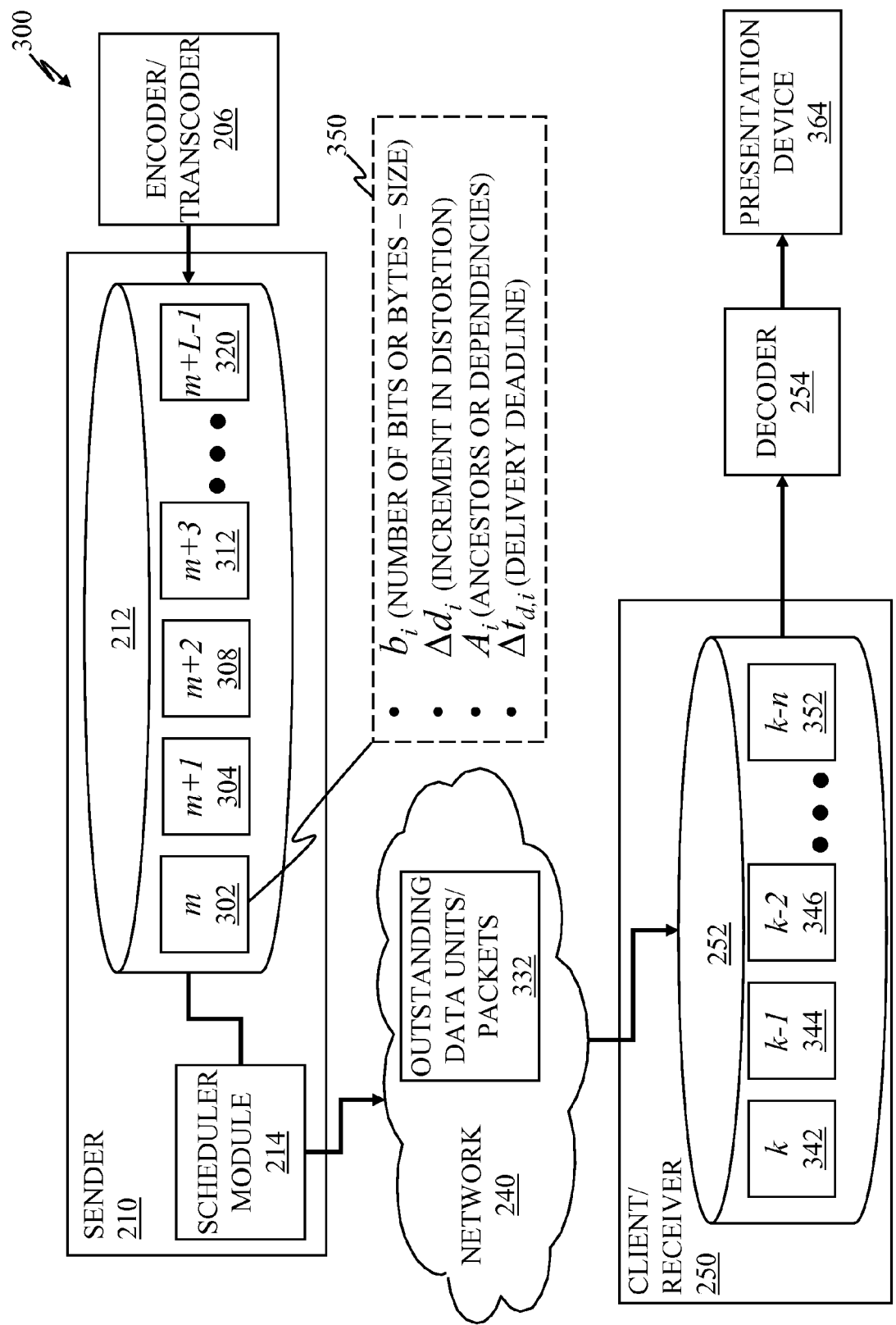
FIG. 3 is a block diagram of another exemplary QASS system, showing data units in a transmission buffer and a receiver buffer, according to an embodiment of the invention.

FIG. 3 is another high-level diagram 300 showing the exemplary QASS system 100, 200 with finer details, according to some embodiments of the invention. For illustrative purposes, let us assume that the source content is video data. In some embodiments, transcoding may be performed 206 so as to adapt or adjust the format, resolution, or bit rate of the video data to the network condition. Based on the coding process or specification employed, a source content is typically divided into one or more data units. Using MPEG coding schemes, for example, a video may be divided into data units that are embodied as frames. In other embodiments, a source content may be divided into other data units such as video slices, group of frames, group of pictures, group of slices, fields, layers, or macroblocks. These data units may be further subdivided, e.g., a frame may correspond to several transmission data units, such as packets. Thus, a frame may correspond to one or more packets, e.g., RTP or UDP packets. At high video quality and high video bit rates, each frame is typically embodied and transmitted as multiple packets. Although the embodiments of the present invention are exemplified herein generally using frames, other data units may also apply. For example, the QASS process described herein may selectively drop or transmit data units other than at the frame level, such as at a sub-frame or packet level, or based on another data unit size or embodiment.

In this example, the TX buffer 212 contains several data units, which are frames m 302, m+1 304, m+2 308, m+3 312, . . . , m+L−1 320. In this example, each frame i 302-320, in the sequence of frames making up the data stream, is typically associated with a number of information 350, such as a size $b_i$—which may be in bits or bytes, for example. Furthermore, each frame i is associated with an increment in distortion $\Delta d_i$ value, or equivalently the decrement in quality, typically because an increase in distortion typically results in a decrement in video quality at the receiver, for example. The $\Delta d_i$ value typically denotes the increase in distortion/decrease in quality that may occur if the frame is not decoded on time, such as, if the frame is discarded or dropped by the scheduler 214 at the server, or if the frame arrives too late at the decoder for decoding. The $\Delta d_i$ value may be measured in different ways. In some embodiments, it may be expressed as a decrease in average peak signal-to-noise ratio (PSNR) or as an increase in average mean squared error (MSE). The $\Delta d_i$ value may also include perceptual measures, which may be based on experiments.

Each frame i is also typically associated with a delivery deadline, $t_{d,i}$, by which time all packets, constituting a coded frame, have to arrive at the client to enable successful decoding. If the frame arrives at the client later than the designated delivery deadline, $t_{d,i}$, that frame is typically discarded and not decoded for presentation. Furthermore, based on coding specification, the decoding of a frame may depend on the successful decoding of other frames. Some frames in the data stream, for example, may be used as references to code other frames, i.e., inter-frame coding. For example, an I-frame may be used as reference to code a P-frame, while a P-frame may be used as reference to code another P-frame or a B-frame. In the recent H.264/Advanced Video Coding (AVC) specification or standard, a B-frame may also be used as a reference frame. This B-frame dependency, however, was not implemented in previous standards, such as in MPEG-2. H.264 has been adopted by the Moving Picture Experts Group (MPEG) standards to be a video compression scheme. This standard is also known by other names, including Joint Video Team (JVT), ITU-T H.26L, MPEG-4 AVC, or ISO MPEG-4 part 10. The use of H.264/AVC or other MPEG specification is for exemplification purposes and to facilitate understanding of the various embodiments of the invention. The embodiments of the invention, thus, may apply to other video encoding and/or decoding standards, other file formats, and generally to source contents that are encoded, transmitted, and decoded, particularly utilizing a transmission buffer or a receiver buffer.

Frames that are used as reference to code other frames are typically called reference frames, while frames that are not are typically called non-reference frames. A multimedia source content, for example, may contain a number of media objects, e.g., audio and video. Regardless of the number of media objects in the source content and regardless of the encoding and packetizing algorithms employed, the resulting data units of this source content for presentation may typically be expressed by a directed acyclic graph (DAG). In other words, the dependencies between frames, for example, in the streaming data stream may be expressed by a DAG. Each node in the graph typically corresponds to a data unit, e.g., a frame, and each edge of the graph directed from data unit j to data unit i corresponds to a dependence of data unit i on data unit j. This typically means that in order for data unit i to be decoded, data unit j has to be decoded first, i.e., frame i depends on frame j. We refer to frame j as an ancestor of frame i, while frame i is called a descendant of frame j. The set of ancestors for frame i is herein denoted by $A_i$. Each frame or data unit in the TX buffer is thus also typically associated with its ancestors. One of ordinary skill in the art will appreciate that in general, a frame is a descendant and/or an ancestor of one or more frames typically based on coding dependencies. Each frame may also be associated with other information, not shown. For example, the coding type/frame type and/or sequence number of the frame may be indicated or associated with each frame.

Coded data 302, 304, 308, 312, 320 ready for possible transmission to the client are typically stored or held in the TX buffer 212. The scheduler module 214 then performs the QASS process on the data units in the TX buffer 212. Typically, the QASS process is performed at each transmission opportunity to some or all data units in the TX buffer 212. As a result of the QASS process, the first data unit or the data unit in the front or start of the TX buffer, which in this example is frame m 302 may then be dropped/omitted/discarded, i.e., not transmitted to the client, or may be transmitted to the client 250. The scheduler 214, in some embodiments, has the capability to decide to transmit or drop entire frames. The frames 302-320 in the TX buffer 212 are also typically transmitted by the scheduler 214 in their decoding order, i.e., no out-of-order transmission. By transmitting the frames in decoding order, computational complexity in some aspects is reduced.

Data units, in this example, frames consisting of one or more packets, may be received at the client 250. These received data units 342, 344, 346, 352 are typically held in a client receiver (RX) buffer 252, before being decoded 254. The RX buffer 252 is illustrated containing several received frames k 342, k−1 344, k−2 346, . . . , k−n 352. These received data units 342-352 are decoded 254 and then rendered or presented at the client, for example, via a presentation device 364, such as a television set.

Data units are typically transported from the sender 210 to the client 250 via one or more network segments 240. A number of data units 332, however, may be outstanding in the network. These data units, e.g., packets, are typically those packets typically transmitted by the application/transport layers of the sender 210, but not yet received by the client 250. The application or transport layer is typically those associated with the Open System Interconnection (OSI) reference model. In some embodiments, these outstanding packets are held or stored in intermediate buffers in one or more nodes in the network. In the case of transmission over a wireless link, a number of packets may be held, for example, in a buffer at the media access control (MAC)/physical (PHY) level, typically at the sender side, still to be transmitted.

The QASS embodiments of the present invention also typically do not utilize cross-layer information exchange from and between lower protocol layers, such as MAC or PHY to higher protocol layers, e.g., application or transport layer. The QASS process of the present invention is an application layer/ transport layer scheme, and hence, typically more easily applied or implemented. In some embodiments, there may be some interaction, typically minimal, with the transport layer, e.g., the QASS process may receive RTCP receiver reports to infer the channel or system status. The embodiments of the present invention may also work if there are cross-layer information exchanges, e.g., link status coming from the MAC up to higher layers. The embodiments of the present invention also typically do not explicitly provide information to the MAC layer or provide actions/decisions for the MAC.

Figure 4:
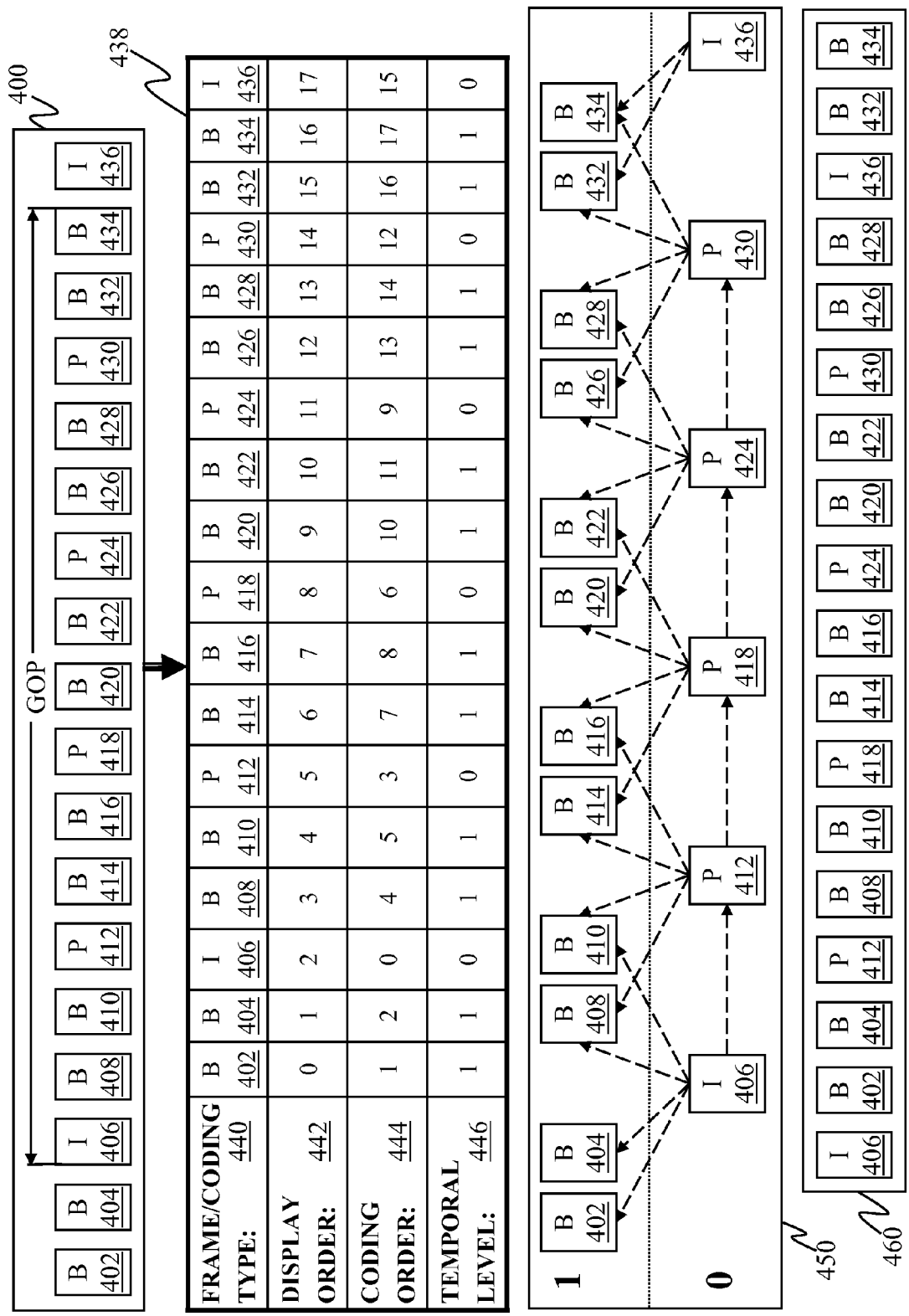
FIG. 4 is an exemplary representation of frames as a group of pictures, including their temporal levels, according to an embodiment of the invention.

FIG. 4 illustrates an exemplary portion of a data stream 400 with a conventional IBBPBB . . . sequence of frames 402, 404, 406, 408, 410, 412, 414, 416, 418, 420, 422, 424, 426, 428, 430, 432, 434, 436. There are fifteen frames 406-434 per group of picture (GOP). This is a conventional IBBPBB . . . sequencing, because the structure does not have hierarchical B-frames as defined in H.264/MPEG-4 part 10. In general, a stream or a GOP is conventional if it does not contain hierarchical B-frames.

A frame i may also be associated or defined with a temporal level, which is the level of that frame in a hierarchical temporal prediction structure. In such a structure, there is typically a base level that consists of frames that are coded without reference to frames in other levels. Furthermore, the frames in each successive level of the hierarchy are coded with reference only to the frames in previous hierarchy levels. Such a hierarchical prediction structure provides a natural form of temporal scalability. The temporal level of a frame thus relates to coding dependencies within frames.

FIG. 4 also illustrates a DAG 450 with all I-and P-frames 406, 412, 418, 424, 430, 436 forming a base level with temporal level of zero ("0"). This diagram shows the temporal levels of the exemplary data stream 400. The exemplary table 438 indicates coding order 444 and to some extent, dependencies to reference frames, frame coding types 440, presentation order 442, and temporal levels 446. All B-frames 402, 404, 408, 410, 414, 416, 420, 422, 426, 428, 432, 434 in this exemplary sequence of frames have temporal level equal to one ("1"). In this example, the first I-frame 406 is an ancestor of four B-frames 402, 404, 408, 410 and of the first P-frame 412. The exemplified first four B-frames 402, 404, 408,410 and the first P-frame 412 are descendants of the I-frame 406.

The bottom diagram 460 of FIG. 4 shows the exemplary data units 400 in coding order and transmission order within the TX buffer 212. This coding order and transmission order also typically represent the data units queuing order in the TX buffer 212, for example, the first I-frame 406 is the first frame to be transmitted followed by the B-frame 402, and so on. The last B-frame 434 is the last data unit transmitted in this exemplary set of frames.

Figure 5:
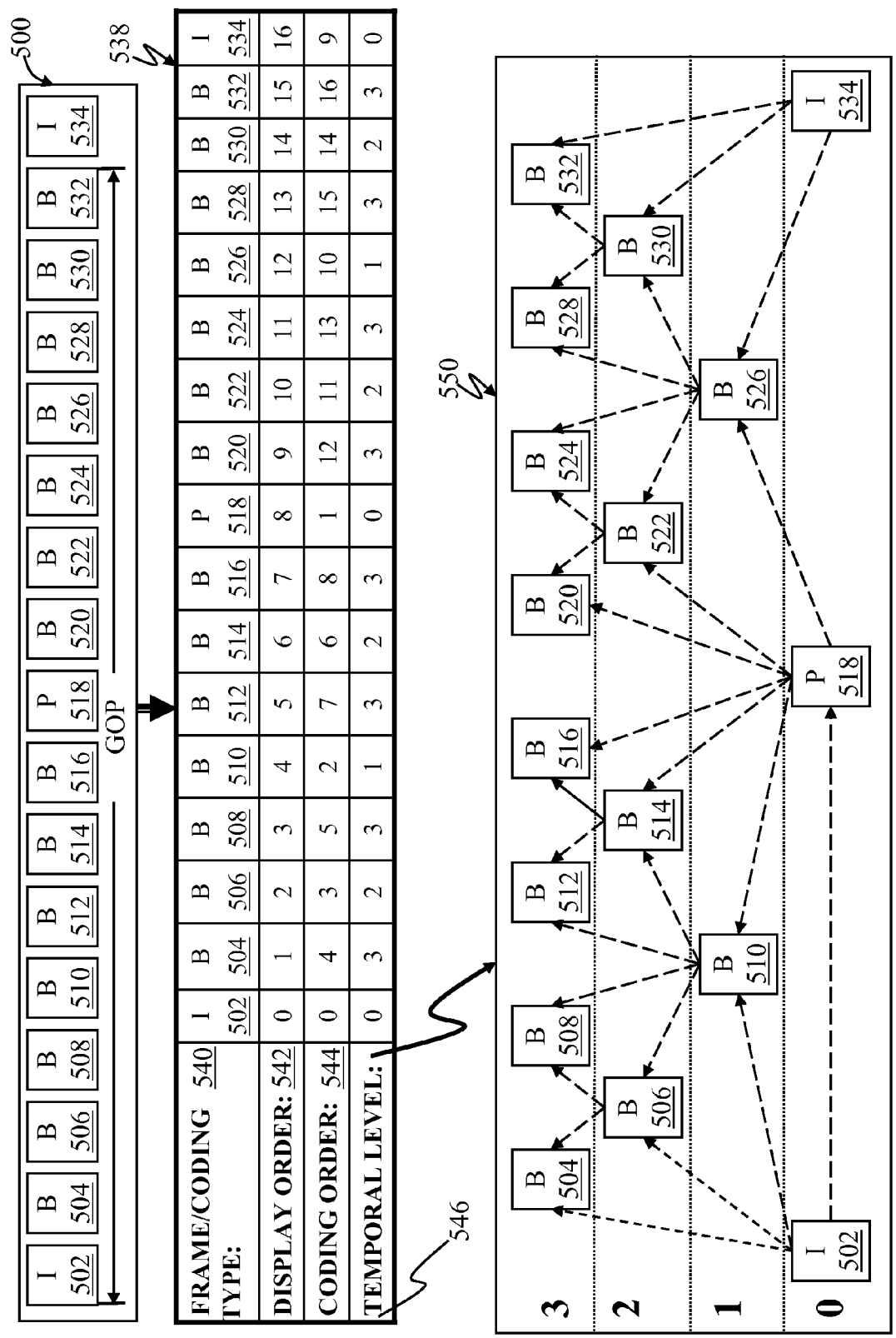
FIG. 5 is another exemplary representation of frames as a group of pictures but with hierarchical B-frames, including their temporal levels, according to an embodiment of the invention.

FIG. 5 illustrates another portion of an exemplary data stream 500 complying with the H.264/AVC bit stream with non-conventional or hierarchical B-frames structure with temporal level values greater than one ("1"). The exemplary bit stream contains several frames 502, 504, 506, 508, 510, 512, 514, 516, 518, 520, 522, 524, 526, 528, 530, 532, 534 with all I-and P-frames 502, 518, 534 forming a base level with a temporal level of zero ("0"). The exemplary table 538 indicates coding order and dependencies 544, frame coding types 540, presentation order 542, and temporal levels 546. The temporal level and dependencies are represented in the diagram 550 at the bottom of FIG. 5.

Figure 6:
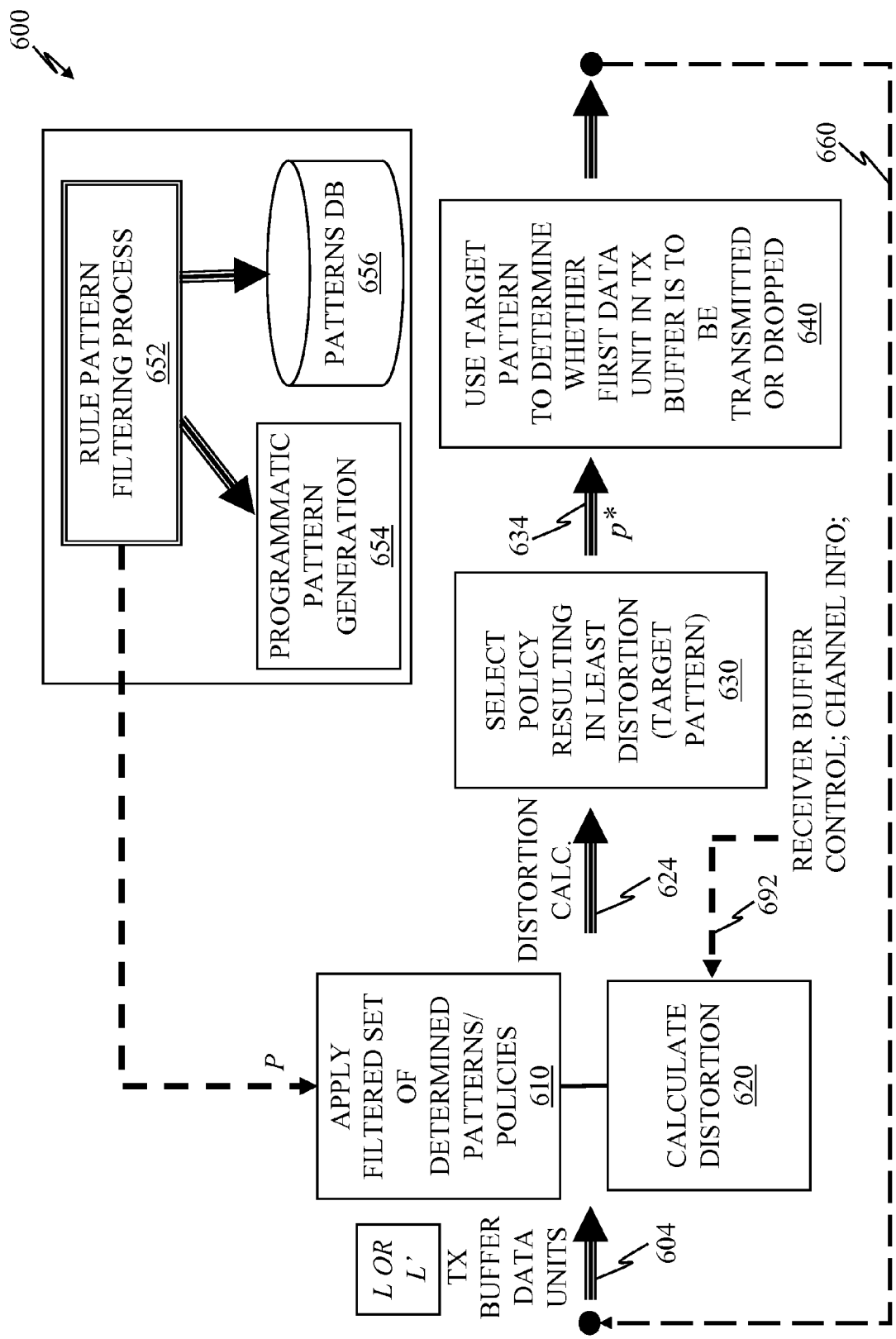
FIG. 6 is a high-level data flow of another exemplary QASS system, according to an embodiment of the invention.

FIG. 6 is a high-level block diagram 600 illustrating an exemplary QASS process of the present invention, according to an embodiment of the invention. The exemplary QASS process, for example, embodied in the scheduler 214, is typically adapted to provide a higher quality, e.g., video quality, in the face of constraints imposed by the system in general. Such constraints may include, but are not limited to, available bandwidth, maximum latency, or maximum amount of data units buffered. For example, if the source content is audiovisual (AV) data, the scheduler 214 may adapt or adjust the rate of the AV data stream in order to meet the constraints, as well as to minimize the change in quality of the received AV stream at the client side 250. The scheduler 214 may also generally base its QASS process on a model of the transmission channel in order to determine or estimate future channel or network behavior. The scheduler 214 may also base its QASS process on the model or coding scheme of the source content or AV data stream, e.g., the IBBPBBP . . . structure of the source content, and in particular the effect of discarding particular data units on the overall quality.

Based on the data units in the TX buffer, the exemplary QASS process may filter or search through 652 a set of selected scheduling patterns or policies 654, 656 to determine a target transmission/omission or scheduling pattern. The set of scheduling patterns to filter through may be based from programmatically generated patterns 654, predefined patterns within a data store 656, or a combination of both, for example. The patterns selected are typically based on pattern-selection or heuristic rules 652. There is typically a plurality of pattern-selection rules, from which the QASS system may select a subset thereof. This set of filtered, selected or determined scheduling patterns may be applied 610 to all the data units in the TX buffer or to only some of the data units in the TX buffer 604. The data units 604, as mentioned above, are typically associated with size, delivery deadline, increment in distortion, and/or ancestor information. Such associated information may be contained, for example, in the header area and/or payload area, for example 604. Each scheduling pattern in general indicates whether a data unit in the TX buffer is to be transmitted or not, i.e., dropped or omitted, hence, they are also called transmission/omission patterns or policies.

To further explain, referring also to FIG. 3, at a transmission opportunity at time $t_m$, the exemplary TX buffer 212 contains exemplary frames [m, m+1, m+2, . . . , m+L−1] 302-320, 604. In this example, the number of frames in the TX buffer is L. Note, however, that generally the number of frames in the TX buffer may vary over time, hence $L=L_m$. We omit the subscript for simplicity of notation. The frames or data units in the TX buffer 212 are typically in the decoding or coding order 444, 544 for the coded source stream. Described in another way, at time or transmission opportunity $t_m$, the scheduler 214 chooses a schedule, based on a policy or pattern, consisting of a sequence of decisions to either transmit or omit/drop frames m, m+1, m+2, . . . . The number of all possible patterns or policies at time $t_m$, however, is potentially very high—$2^L$, where L is the number of frames in the TX buffer. Furthermore, this search space may vary for different time instances. The search space or the set of all possible patterns or policies at time $t_m$ is denoted by U. i.e., the set of all possible patterns or policies p of length L. For example, if we consider 15 frames in the TX buffer, the number of different patterns may be $2^{15}$—i.e., 32,768. Therefore, performing an exhaustive search over all patterns in U may be prohibitively computationally expensive. The embodiments of the present invention limit the search space by limiting the scheduling patterns to a small subset of U, denoted by P, conforming to one or more pattern-selection rules or heuristic rules as discussed herein. Limiting the scheduling pattern search space to P according to the embodiments of the invention, however, typically does not impact the performance or quality result and, moreover, reduces the computational resources needed. Typically the set P has two or more scheduling patterns p.

A transmission/omission or scheduling pattern denoted, for example, as $p_m=[a_m, a_{m+1}, a_{m+2}, \ldots, a_{m+L-1}]$ at time $t_m$ may contain or be associated with a sequence of decisions $a_i$, where $a_i=1$, for example, may indicate transmission of the associated or corresponding data unit i in the TX buffer and $a_i=0$ may indicate dropping of that data unit i. In general, a scheduling pattern is a kind of transmission policy vector, wherein the QASS process embodied in the scheduler, for example, chooses a potentially optimal policy vector—hence a potentially optimal transmission/omission or scheduling pattern. In some embodiments, each scheduling pattern is embodied as a predefined or static table or a data record stored in a patterns data store, e.g., in a table, in memory, in a file, and/or in a database. The exemplary table, for example, may contain a number of transmission/omission decisions, where a "1," for example, may indicate transmission and a "0" may indicate an omission/dropping, i.e., do not transmit. Other values aside from "1" and "0" may also be used. Each transmission/omission decision is also associated with a data unit in the TX buffer. In other embodiments, the table is embodied as a bitmask, for example. FIGS. 8A-8I show exemplary scheduling pattern tables or bitmasks, for example. In other embodiments, each pattern may be programmatically generated, which may even be dynamically generated, e.g., the QASS algorithm may be written, for example, in a high-level programming language where the transmission/omission patterns with their corresponding transmission/omission decisions are dynamically generated via a set of program instructions. In some embodiments, a set of program instructions with knowledge of the data structure of the data stream, e.g., IBBPBB . . . structure, may programmatically generate and decide which data unit is to be identified for transmission or omission. One of ordinary skill in the art will appreciate that the scheduling patterns exemplified herein, may be embodied in other forms, e.g., they may be embodied as stored procedures in a Structured Query Language (SQL) or as an array of variables in memory space. Furthermore, one of ordinary skill will appreciate that the length, values, and structure of a pattern typically depends on the structure of the source content, e.g., a GOP with fifteen frames typically has different scheduling patterns compared to a GOP with twelve frames.

Based on the determined or selected set of scheduling patterns P applied to the data units in the TX buffer under consideration—L or L' 604, the QASS process then calculates for each pattern the expected distortion increase/quality degradation 624. A particular scheduling pattern typically induces an expected distortion or expected quality that typically results from transmitting or omitting frames in the TX buffer as indicated or dictated by that pattern. This distortion calculation may depend on the sizes $b_i$ of the frames in the TX buffer, their importance in terms of distortion increments $\Delta d_i$, their delivery deadlines $t_{d,i}$, their dependencies, as well as predicted channel conditions—e.g., available bandwidth, receiver buffer control information, and/or channel information 692. For example, a scheduling pattern that specifies to drop a less important frame, e.g., a B-frame, given a limited bandwidth may result in a higher expected quality compared to a frame scheduling pattern that specifies to drop an important frame, e.g., an I-frame. In another example, patterns that specify to drop less important frames so as to increase the probability that more important frames arrive on time given a limited bandwidth, may result in a higher expected quality. In some embodiments, only a partial distortion increase calculation may be performed on a scheduling pattern, further described below. In some embodiments, the exemplary QASS system influences the receiver buffer 252 fullness at the client/receiver 250, by applying receiver buffer fullness control 692. This may be implemented by replacing the actual delivery deadline, $\Delta t_{d,i}$, associated with the data unit with an earlier receiver target delivery deadline.

From this set of calculated distortion increase values, or partial calculation thereof, 624 associated with the filtered set of determined scheduling patterns, the policy or pattern 630 that provides the least calculated distortion value 624 is then chosen as the target scheduling pattern p*. Based on the pattern or policy associated with that least or minimum calculated distortion value 634, herein referred to as the target transmission pattern, the QASS process accordingly schedules or processes the first data unit in the TX buffer, e.g., the first frame for transmission 302 in FIG. 3, based on the transmission/omission decision associated with that first data unit using the target transmission pattern 640. The first data unit thus may be transmitted to the client if $a_m=1$, for example, or dropped if $a_m=0$, i.e., not transmitted. Typically, this operation includes removing the first data unit from the TX buffer.

Described in another way, at time $t_m$, the scheduler 214 may select the target scheduling pattern p* as the pattern from P with the minimum expected distortion, or equivalently, with maximum expected quality 630. The target transmission pattern p* 634 determines and dictates whether the frame at the front of the TX buffer, e.g., frame m 302, is transmitted or dropped. For example, if $a_m*=0$, the frame is dropped; while if $a_m*=1$, the frame is transmitted. Subsequently, frame m 302 is removed from the server transmission buffer. Then, at the next transmission opportunity at time $t_{m+1} \geq t_m$, the QASS scheduling process is repeated 660. At this time, the previous target transmission pattern is disregarded, distortion calculation 624 for each pattern in P is then again performed 610, 620 on the data units under consideration in the TX buffer 604, and the target transmission pattern determined 630. At this time, the data units in the TX buffer typically do not include the previous first data unit, which in this example is frame m 302. The first data unit in this transmission opportunity $t_{m+1}$, for example, is m+1 304. In some embodiments, at this transmission opportunity or time iteration, a new set of P 610 may be determined. In general, for each iteration, a new set P is determined, even if the same heuristic rules are applied. Considering that the patterns are typically based on the data units, e.g., frames, in the TX buffer, at a point of processing, the first frame at the front of the TX buffer may be removed—whether transmitted or dropped, while new frames at the end of the TX buffer are added, as well; thus, at each iteration 660 a new set of P is usually determined 652. In this exemplary QASS embodiment, the process considers the most recent system status and channel condition 692, and accordingly enhances its decisions accordingly.

Thus, in general, the QASS-processed data 230 may be a filtered set of data, wherein data units in the TX buffer may be dropped during QASS processing. In some embodiments, however, constraints, for example, such as network conditions, delay constraints, or size of data units, may be such that no data units have to be dropped prior to transmission to the client—thus, the QASS-processed data may be the entire data stream.

Distortion Increase/Quality Degradation Calculation:

Let $n_i(p)$ be the number of packets in the TX buffer that typically has to be transmitted in order to deliver frame i, given transmission/omission pattern p. Typically, the number of packets corresponding to each frame in the TX buffer, the sizes of the frames in the TX buffer $b_m, b_{m+1}, b_{m+2}, \ldots, b_{m+L-1}$, the packetization scheme, e.g., packet size, and/or which packets belong or are associated with each frame, may be known, for example, by parsing the packets themselves and by other means known to those of ordinary skill in the art.

The value of $n_i(p)$ includes the number of packets for each frame that may be transmitted according to pattern p up to and including frame i in the TX buffer. The value of $n_i(p)$ also includes an estimate of the number of outstanding packets $o_m$ in the channel at time $t_m$. Existing techniques may be used to estimate the number of outstanding packets, such as the processes described in the patent application entitled "Content-Aware Adaptive Packet Transmission," filed Nov. 16, 2006, with application Ser. No. 11/560,457, herein also called as "CAAPT U.S. Application." The CAAPT U.S. Application is herein incorporated in its entirety for the purpose of disclosing a manner of estimating the number of outstanding packets. In some embodiments, this exemplary system disclosed in the CAAPT U.S. application utilizes RTP/RTCP receiver reports, the highest number of packets already sent by the sender, and the highest number of packets received by the receiver to estimate $o_m$. Other methods of estimating the number of outstanding packets may also be employed in the exemplary QASS process of the present invention.

For example, suppose that the first frame in the TX buffer, frame m 302, consists of 40 packets, and that the second frame, frame m+1, consists of 30 packets, and that frame m+2 and frame m+3 each consists of 20 packets. Let us assume that the number of outstanding packets is equal to 32, i.e., $o_m=32$. Then, for a scheduling patterns, where frames m, m+1, m+2, and m+3 are to be transmitted, i.e., $a_m=a_{m+1}=a_{m+2}=a_{m+3}=1$, the number of packets for $n_m(p)=72$ packets, $n_{m+1}(p)=102$ packets, $n_{m+2}(p)=122$ packets, and $n_{m+3}(p)=142$, respectively. For a similar transmission pattern with $a_{m+2}=0$, i.e., frame m+2 is going to be dropped or not transmitted, the number of packets for frame m+3 is reduced to $n_{m+3}(p)=122$ packets.

Alternatively, $n_i(p)$ may be expressed in number of bits or bytes, instead of numbers of packets. In this exemplary embodiment, the values of $n_i(p)$ may be directly computed given the sequence of packets and their sizes and given the correspondence between packets and frames. Furthermore, in this embodiment, $o_m$ may correspond to an estimate of the number of bits or bytes outstanding in the channel at time $t_m$, rather than just the number of packets. This number may be estimated based on the CAAPT U.S. Application mentioned above or via other methods. Furthermore, the sender may keep track of the cumulative number of bits/bytes of payload data sent from the start of the session until after a data packet with a certain sequence number has been sent. This information may be used to estimate the cumulative number of bits/bytes of payload data received at the receiver. The difference between the cumulative number of bits/bytes sent by the sender and the estimate of the cumulative number of bits/bytes received by the receiver thus may provide an estimate of the number of bits/bytes outstanding in the channel.

Let $T_{n_i(p)}$ be the estimated random time it takes to successfully transmit $n_i(p)$ packets over the channel. In this exemplary embodiment, $n_i(p)$ may be expressed in number of bits or bytes, with $T_{n_i(p)}$ corresponding to an estimated random time it takes to successfully transmit $n_i(p)$ bits/bytes over the channel. Typically, $T_{n_i(p)}$ is a random variable due to the generally stochastic nature of the channel. The probability that frame i in the TX buffer arrives late at the client 250 is the probability that $T_{n_i(p)}$ is greater than the time interval available from the delivery deadline time, $t_{d,i}$, of frame i, which may be expressed as:

$$Pr\{T_{n_i(p)} > t_{d,i} - t_{now}\},$$

where $t_{now}$ is the current time.

Let $E_i(p)$ be the probability that frame i is not decoded correctly as a function of the scheduling or transmission/omission pattern p. Typically, $E_i(p)=1$, i.e., the frame is not going to be decoded properly, if frame i or any frame in $A_i$—i.e., the ancestors of frame i, is omitted or dropped based on pattern p; and otherwise, we approximate that probability $E_i$, where:

$$E_i(p) \approx Pr\{T_{n_i(p)} > t_{d,i} - t_{now}\}.$$

The expected increase in distortion, associated with the decrease in quality, resulting from applying a particular transmission pattern p at time $t_m$ may be expressed as:

$$\Delta D(p) = \sum_{i=m}^{m+L-1} E_i(p) \cdot \Delta d_i.$$

The expected increase in distortion for a particular pattern p in general terms is obtained by adding the probability of each data unit in the TX buffer under consideration is not going to be decoded properly as a function of the transmission pattern multiplied by the appropriate increment distortion associated with that frame.

The target transmission pattern p* with the minimum expected distortion or maximum expected quality may be expressed as:

$$p^* = \underset{p \in P}{\operatorname{argmin}} \left( \sum_{i=m}^{m+L-1} E_i(p) \cdot \Delta d_i \right). \quad \text{(Equation 1)}$$

The search procedure to determine the target transmission pattern p* essentially consists of computing, for each pattern p, the expected increase in distortion/decrease in quality over the frames in the TX buffer under consideration $\Delta D(p)$, and selecting the pattern with minimum expected increase in distortion. The ΔD(p) is thus the overall or partial pattern distortion value based on data units under consideration and based on the pattern applied.

Video Distortion/Quality Model:

A particular scheduling pattern typically induces an expected distortion or expected quality that results from transmitting or omitting frames in the TX buffer as indicated by that particular pattern. To select data units to be dropped for a particular data stream, the exemplary QASS process may first calculate an approximate expected PSNR for the stream if no frames in the TX buffer are dropped. In some embodiments, expected PSNR is calculated by considering the number and sizes of packets that have to be successfully delivered by each frame's delivery deadline, statistics characterizing the time required to transmit the packets, and a model characterizing the PSNR that may result if the frames are not delivered on time.

Following are exemplary methods to model and compute $\Delta d_i$, the increment in distortion, or equivalently the decrement in quality, if frame i is estimated not to be decoded properly at the client. In the preferred embodiment, $\Delta d_i$ may be computed on the basis of a decrease in peak signal-to-noise ratio (PSNR) of the GOP containing that frame i. In one embodiment, we may approximate that for a particular data stream, the increment in distortion, $\Delta d_i$, depends only on the PSNR type of the frame i in the GOP containing that frame. The PSNR type, for each frame in that GOP, for example, may be predefined within the QASS system or be calculated, as discussed below. In this embodiment, where $\Delta d_i$ is based only on the PSNR, $\Delta d_i$ may be expressed as:

$$\Delta d_i = \Delta PSNR_{g(i)}$$

where g(i) is a function that returns the PSNR type of frame i for the purpose of computing its expected decrease in PSNR. The PSNR type is not necessarily the same as the coding type of that frame.

a) First Exemplary Embodiment

Figure 7:
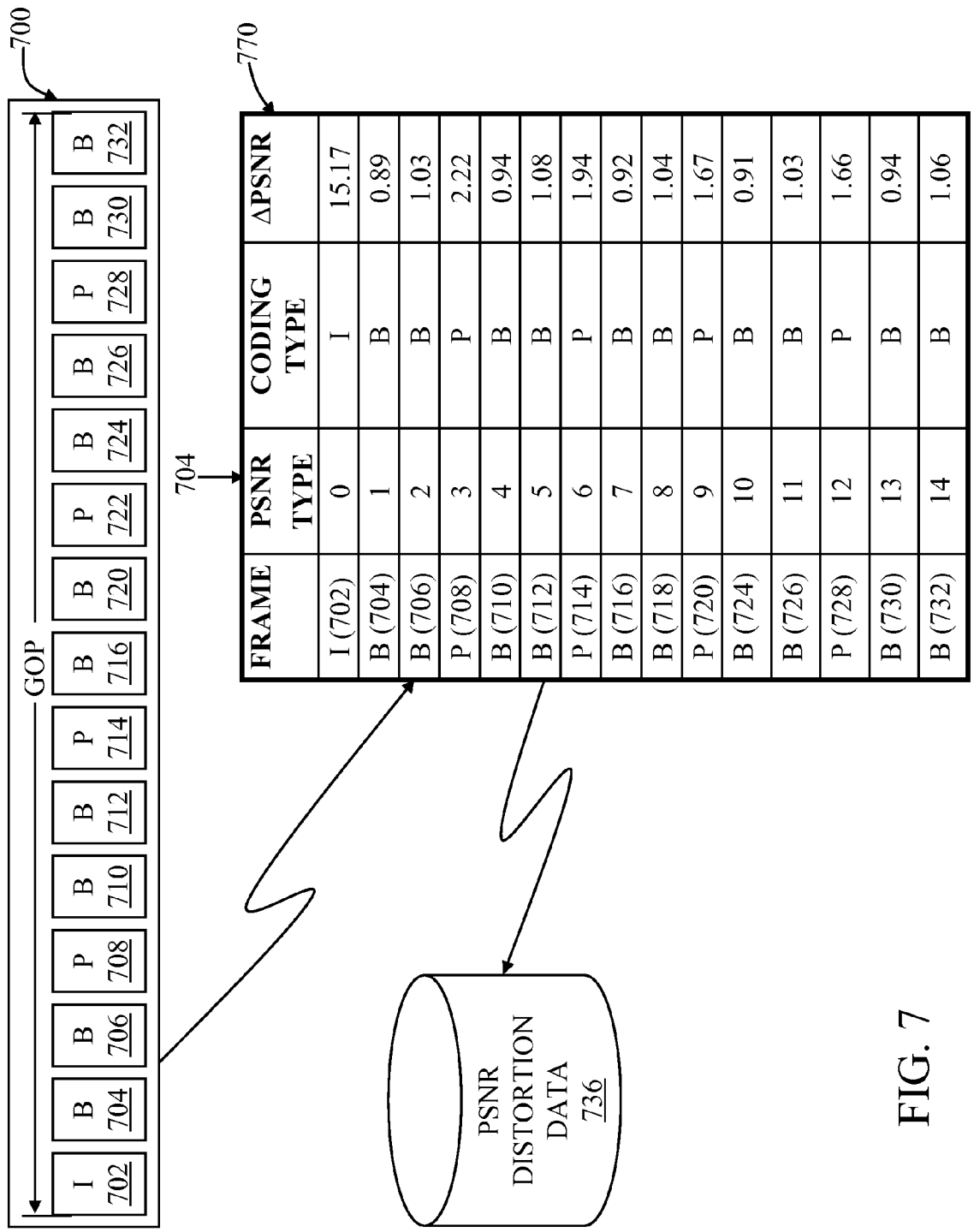
FIG. 7 is a high-block diagram illustrating data units in a group of picture and an associated exemplary peak signal-to-noise ratio, according to an embodiment of the invention.

FIG. 7 shows an exemplary IBBPBB . . . GOP structure 700 and an exemplary PSNR Distortion table 770 associated with that GOP 700 with I-frame 702, P-frames 708, 714, 722, 728, and B-frames 704, 706, 710, 712, 716, 720, 724, 726, 730, 732. A table 770 shows exemplary ΔPSNR values computed for this exemplary 15-frame video sequence. In an exemplary embodiment, the QASS system assigns a PSNR type for every frame in a GOP. For example, each PSNR type corresponds to or is associated with a frame or data unit, particularly the position of that frame in a GOP. Furthermore, each PSNR type is associated with a decrease in PSNR, ΔPSNR. The PSNR Distortion table 770, for example, may be stored in a data store 736, such as in a small table, one or more memory locations, and/or a file, that is accessible to the QASS system. In general, the overall reduction in quality of a GOP caused by dropping a frame is related to the sum of the ΔPSNR value of the dropped frame and the ΔPSNR values of its dependent frames, i.e., its descendants.

In this example, the first and second B-frames 704, 706 of the GOP have a different PSNR type 704, and each of that B-frame may have a different ΔPSNR assigned to it. For example, the first B-frame 704 is assigned ΔPSNR value of 0.89, while the second B-frame 706 is assigned ΔPSNR value of 1.03. P-frames in the GOP may also have a different PSNR type, with that type associated with its own ΔPSNR value. The I-frame may also have an associated ΔPSNR value that is typically very high to ensure or maximize on-time delivery of all I-frames. Typically, the ΔPSNR associated with the PSNR frame type and accordingly with the frame in the GOP, is generally the estimated amount by which the PSNR of the GOP is reduced as a result of having that frame not be received at the client or be undecodable, for example, because that frame is not received by the delivery deadline. These values, for example, may be obtained via experiments, which are known to those of ordinary skill in the art. This exemplary method thus is adapted to enable the QASS system or process to implicitly consider the effects of different error concealment techniques, which may be used at the decoder in the event that a frame is missing or may not be reconstructed correctly. One of ordinary skill in the art will appreciate that the PSNR table may depend on the structure of the video, for example.

b) Second Exemplary Embodiment

In another exemplary embodiment, the QASS system assigns a different PSNR type for P-and B-frames based on its temporal level, and, in addition, assigns a separate PSNR type to the I-frame. For example, in a conventional 15-frame IBBPBBP . . . GOP, the I-frame may be assigned PSNR type "0," all P-frames may be assigned PSNR type "1," and all B-frames may be assigned PSNR type "2." In this embodiment, $\Delta PSNR_0$ is defined as the amount by which the PSNR of the GOP is reduced as a result of a missing or undecodable I-frame, $\Delta PSNR_1$ is defined as the amount by which the PSNR of the GOP is reduced as a result of a missing or undecodable P frame, $\Delta PSNR_2$ is defined as the amount by which the PSNR of the GOP is reduced as a result of a missing or undecodable B frame.

Table IA shows another exemplary PSNR Distortion table with exemplary estimated ΔPSNR parameters computed for a sample video sequence with a 15-frame IBBPBBP . . . GOP structure 700, similar to that shown in FIG. 7. The PSNR type of this embodiment is generally based on the temporal level and/or frame coding type.

TABLE IA

Exemplary PSNR Distortion Table

| PSNR TYPE: | CODING TYPE: | ΔPSNR |
|---|---|---|
| 0 | I | 15.17 ($\Delta PSNR_0$) |
| 1 | P | 1.87 ($\Delta PSNR_1$) |
| 2 | B | 0.98 ($\Delta PSNR_2$) |

The second exemplary embodiment is discussed in a paper entitled "Optimized Transcoding Rate Selection And Packet Scheduling For Transmitting Multiple Video Streams Over A Shared Channel," by M. Kalman, B. Girod, and P. van Beek, Proc. at the IEEE Int. Conf. on Image Processing (ICIP 2005), September 2005, Genoa, Italy ("Kalman Paper"). In this second embodiment, the above ΔPSNR parameters associated with the PSNR type typically depend on the specific video sequence structure, in particular on its average distortion (or quality) and its bit rate. In other embodiments, ΔPSNR parameters may also be estimated or approximated as a function of the PSNR of the coded input video sequence. For example, it may be shown empirically that the value of $\Delta PSNR_1$ for a particular coded video sequence varies approximately linearly as a function of the average PSNR of that sequence. This observation, for example, may likewise apply to the value of $\Delta PSNR_2$.

The above first and second exemplary embodiments thus provide estimation of the increase in ΔPSNR, and accordingly the $\Delta d_i$, based on the average PSNR of the coded video sequence and/or the type of the frame. This may be implemented, for example, as a simple table lookup function, thereby minimizing on-line estimation of these parameters. This embodiment is usually helpful when the PSNR of the input sequence is known, for example, from side information or metadata provided along with the coded video data itself, or may be estimated from the coded video data.

c) Third Exemplary Embodiment

In the third exemplary method, the APSNR parameters, instead of being based on the average PSNR of the input video sequence, are based on the input bit rate of the video sequence or source content, for example. In this embodiment, the input bit rate of the video sequence may be determined by keeping track of the sizes, in bits or bytes, of input video frames over an interval of time.

In this exemplary embodiment, each of the ΔPSNR parameters for the P- and B-frames, $\Delta PSNR_1$ and $\Delta PSNR_2$, respectively, is calculated as a linear function of the logarithm of the input bit rate of the video sequence. Experiments conducted by the applicant have shown that linear relation may work reasonably well over a wide range of input bit rates. The ΔPSNR parameters, for example, may be expressed as:

(a) $\Delta PSNR_1$ for P-Frames $$\Delta PSNR_1(R) = a_1 \cdot \log(R) + b_1$$

(b) $\Delta PSNR_2$ for B-Frames $$\Delta PSNR_2(R) = a_2 \cdot \log(R) + b_2$$

where R is the input bit rate, which may be assigned or calculated. The exemplary four parameters $a_1$, $b_1$, $a_2$, $b_2$, may be pre-computed using a set of representative video streams encoded at different bit rates. This method enables the calculation of ΔPSNR parameters without any prior knowledge about the video sequence structure other than its bit rate. This may be useful in cases where it may be difficult to obtain or calculate estimates of the average PSNR of the input video sequence, or in cases where side-information may typically not be relied upon to provide information about the distortion/quality parameters of the input sequence.

Furthermore, experiments conducted by the Applicant have shown that explicit modeling of the ΔPSNR parameter for I-frames, $\Delta PSNR_0$, may not be necessary. In some embodiments, it may be sufficient to set $\Delta PSNR_0$ either to a large constant value, e.g., between 7 to 15 dB, or to a value in proportion to the ΔPSNR for P-frames, $\Delta PSNR_1$, for any video input sequence.

A further embodiment may be achieved based on the observation that the result of the search for the target transmission/omission or scheduling pattern/policy, as described by Equation 1 above, may be unchanged when the values of $\Delta d_i$ for all frames are scaled by an arbitrary but fixed scaling factor. In other words, in some embodiments, the absolute values of the $\Delta d_i$ parameters may not be that important; but the relative values of these parameters with respect to each other may be more important. Therefore, in some embodiments, the model for $\Delta d_i$ in terms of a normalized measure of PSNR-decrease termed n-ΔPSNR may be expressed as, shown below.

$$\Delta d_i = n\text{-}\Delta PSNR_{g(i)}$$

In some embodiments, a different value of n-ΔPSNR for I-, P- and B-frames may be applied. The n-ΔPSNR value for B-frames, n-$\Delta PSNR_2$, for example, may be normalized to 1.0. The n-ΔPSNR value for P-frames, n-$\Delta PSNR_1$, may be set in proportion to the n-ΔPSNR value for B-frames, n-$\Delta PSNR_2$. The n-ΔPSNR value for I-frames, n-$\Delta PSNR_0$, may be set in proportion to the n-ΔPSNR value for P-frames, n-$\Delta PSNR_1$. This exemplary embodiment may lead to an exemplary table represented by Table IB.

TABLE IB

Exemplary Table for the n-ΔPSNR values:

| n-ΔPSNR TYPE: | CODING TYPE: | n-ΔPSNR |
|---|---|---|
| 0 | I | $K_2 \cdot$ n-$\Delta PSNR_1 = K_2 \cdot K_1$ (n-$\Delta PSNR_0$) |
| 1 | P | $K_1 \cdot$ n-$\Delta PSNR_2 = K_1$ (n-$\Delta PSNR_1$) |
| 2 | B | 1.0 (n-$\Delta PSNR_2$) |

In general, the parameters $K_1$ and $K_2$ may be determined based on a priori experimental measurements and stored in memory for on-line access or use, when running the QASS process described herein. As mentioned above, in some embodiments, we may set $K_2=1.0$ or another constant value larger than 1.0, for any video input sequence. As a result, only one model parameter, $K_1$, remains for the QASS system to maintain or monitor.

In certain embodiments, such as streaming of stored video, it may be possible to determine $K_1$ for a specific video sequence and store its value for on-line use during actual streaming. In other embodiments, such as streaming of live video, determining and storing $K_1$ may not be possible. In this streaming live video embodiment, one alternative is to set or assign the $K_1$ value based on off-line measurements on a representative set of video sequences. The set of representative video sequences may include video sequences of a certain spatial and/or temporal resolution, and/or video sequences encoded at a certain bit rate, and/or video sequences encoded with a certain compression format, such as, but not limited to, MPEG-2 and MPEG-4. Another alternative is to estimate $K_1$ during streaming, e.g., estimating $K_1$ as a function of the input bit rate of the video sequence.

In summary, a low-complexity video quality model may be utilized in conjunction with the methods described herein for determining a target transmission/omission pattern. The model parameters may be computed on the basis of the expected decrease in quality of the video as a result of the absence of a video frame. In one embodiment, the model parameters may depend only on the coding type/frame type of the video frame, e.g., whether such frame is an I-, P-, or B-frame. In another embodiment, the model parameters may also depend on the temporal level of the video frame. In yet another embodiment, the model parameters may be determined off-line based on the specific video sequence that may be streamed later. In another embodiment, the model parameters may be estimated on-line for the video sequence being streamed. In another embodiment, the model parameters may be estimated off-line based on representative video sequences independent of any video sequence that may be streamed. In some embodiments, the model parameters may be fixed for a class of video sequences. In this exemplary embodiment, there is no side-information about any specific video sequence provided to the video streaming system. In other embodiments, the model parameters may be normalized. In other embodiments, other quality measures or distortion measures may be applied, such as based on Mean-Squared-Error (MSE).

Channel Model:

In the following, we describe exemplary methods to evaluate the probability that frame i in the TX buffer may arrive late at the client. In the above we noted that, if $n_i(p)$ denotes the number of packets or bits or bytes that has to be transmitted in order to deliver frame i in the transmission order given scheduling pattern p, and if $T_{n_i(p)}$ denotes the random time it takes to successfully transmit $n_i(p)$ packets/bits/bytes over the channel or link, then this probability may be expressed as:

$$Pr\{T_{n_i(p)} > \Delta t\},$$

where $\Delta t$ is the time interval from the current time, $t_{now}$, until the delivery deadline, $t_{d,i}$, for frame i: $\Delta t = t_{d,i} - t_{now}$. The evaluation of the above probability is typically based on a model of the available channel throughput.

Typically, the probability that the time needed to deliver n(p) packets/bits/bytes is greater than $\Delta t$ may be equal to the probability that the number of packets/bits/bytes than may be successfully transmitted within that time interval $\Delta t$ is smaller than n(p). This may be expressed by:

$$Pr\{T_{n_i(p)} > \Delta t\} = Pr\{N_{\Delta t} < n_i(p)\} \quad \text{(Equation (2))},$$

where $N_{\Delta t}$ denotes the random number of typically equal-sized packets or the random number of bits/bytes that may be successfully transmitted within that time $\Delta t$. Therefore, if we have a model of the distribution of $N_{\Delta t}$, the right-hand side of Equation (2) is equivalent to its cumulative distribution function (CDF) $F_N$ evaluated at $n_i(p)-1$, or:

$$Pr\{N_{\Delta t} < n_i(p)\} = Pr\{N_{\Delta t} \leq n_i(p)-1\} = F_{N_{\Delta t}}(n_i(p)-1).$$

i) Normal (Gaussian) Distribution

In a preferred embodiment, the distribution of $N_{\Delta t}$ is modeled by a Normal (Gaussian) distribution. In this embodiment, the QASS system keeps track of the average channel throughput $\mu_N$ as well as its standard deviation $\sigma_N$, both in terms of the number of packets or number of bits/bytes delivered per time unit. Average throughput and standard deviation may then be used to evaluate the CDF of a Normal distribution with mean $\mu_N \cdot \Delta t$ and standard deviation $\sigma_N \cdot \Delta t$ at $n_i(p) - 0.5$. The latter includes a 0.5 term for continuity correction. In some cases, continuity correction may not be needed.

Numerical evaluation of the Normal CDF may be performed in several ways known to those skilled in the art, with various degrees of accuracy. An approximation to the Normal CDF exists and may be applied that enables evaluation of $F_N$ using only a few additions, multiplications/divisions, and comparisons. This approximation is accurate to two decimal places, which is sufficient for this application or QASS process.

ii) Poisson Distribution

In an alternative embodiment, the distribution of $N_{\Delta t}$ is modeled by a Poisson distribution. This also entails having the packet arrival process being modeled as a Poisson process. In this embodiment, the QASS system keeps track of the average channel throughput $\mu_N$ in terms of the number of packets or number of bits/bytes delivered per time unit. This average throughput may be used to evaluate the CDF of a Poisson distribution with parameter $\mu_N \cdot \Delta t$ at $n_i(p)$. In this embodiment, the exemplary QASS system does not have to keep track of the standard deviation of $N_{\Delta t}$. Numerical evaluation of the Poisson CDF again may be performed using standard mathematical routines known to those skilled in the art.

As shown, the above models of the channel enable low complexity or low processing methods to evaluate Eq. (2) above and to easily compute the probability of a frame arriving late. As mentioned, $N_{\Delta t}$ may be expressed either in number of packets or in number of bits or bytes. The channel model described above typically does not necessarily require the use of cross-layer information, such as from the PHY or MAC layers.

Furthermore, existing techniques may be used to estimate the mean and standard deviation of the throughput, which may vary over time. Therefore, the system typically keeps track of the throughput in a dynamic, real-time manner. Methods to estimate throughput (or available bandwidth) are provided in the CAAPT U.S. application, which also for this purpose is herein incorporated by reference in its entirety. Other techniques of estimating throughput or available bandwidth are also disclosed in U.S. application Ser. No. 10/676,941 entitled "Wireless Video Transmission System" filed Sep. 30, 2003, and in U.S. application Ser. No. 11/113,001 filed Apr. 21, 2005, which claims the priority of U.S. Provisional Application 60/623,362 filed on Oct. 30, 2004. These two U.S. applications and the CAAPT U.S. Application are herein incorporated in their entirety for the purpose of disclosing techniques of estimating throughput or available bandwidth. Other available techniques may also be applied to estimate throughput and bandwidth Briefly, the QASS system or another system interfacing with the QASS system, typically, at the client, may collect samples $S_k$ of the throughput by observing the packet arrival process. Then, the system uses these samples to compute short term estimates of the mean and the standard deviation of throughput. For example, as follows:

$$\mu_N = (1-w_1) \cdot \mu_N + w_1 \cdot S_k$$

$$\sigma_N = (1-w_2) \cdot \sigma_N + w_2 \cdot |S_k - \mu_N|$$

where $w_1$ and $w_2$ are filter coefficients.

The system may collect samples of throughput at the client and relay them to the scheduler 214 at the server by sending feedback messages. Alternatively, the system may compute samples of throughput at the server. In that case, the system may still rely on feedback messages from the client. For example, the system may utilize RTP/RTCP receiver reports to keep track of the packet arrival process. The system may also control the frequency at which feedback messages are sent. For example, the system may send a feedback message from client to server when the last packet of a frame is received. Also, the system may limit the maximum number of data packets received at the client before a feedback message is sent. For example, the client may send a feedback message at least once for every W data packets that it receives. For this purpose, the sequence of packets that are sent from server to client may be partitioned into batches of packets. A batch of packets may contain fewer packets than the number of packets corresponding to a video frame. In this embodiment, the system typically avoids the creation of batches with a very small number of packets. For example, the system may set a limit that the number of packets per batch is always greater than W/2, typically except for very small video frames.

Searching for the Target Transmission/Omission or Scheduling Pattern and Defining the P Set of Patterns:

As mentioned above, the pattern distortion calculation $\Delta D(p)$ for a set of data units is typically based on or is a function of the scheduling pattern applied. The scheduling patterns applied or evaluated to determine the target scheduling pattern are based on the set P of patterns.

To reduce computational complexity, the process of the present invention may apply the following exemplary methods:

a) Example Method 1: Applying the QASS process over a subset of the total number of frames or data units in the TX buffer, e.g., apply the QASS process to L' rather than L number of frames. L indicates the total number of data units in the TX buffer.

In one embodiment, computational complexity is reduced by limiting the number of frames over which to compute or calculate the expected distortion increase or expected quality degradation. For example, if the number of frames in the TX buffer L is too high, the QASS process may perform the minimization algorithm expressed in Equation (1), above, over a smaller number of frames L', thereby reducing the computational resources requirement. In some embodiments, thresholds may be defined such that if L is over a certain value, minimization of Equation (1) above may be calculated using a smaller number of frames L'. Furthermore, the smaller number L' may be defined such that it is a fixed number of frames in the TX buffer or a percentage of L. In other embodiments, a threshold may be set based on resources available, which may be based, for example, on user input. In some embodiments, a fixed threshold $L_{max}$ may be defined or assigned for a particular application or specific implementation in hardware and/or software. This $L_{max}$ value thus may be determined during the design stage, for example. In another embodiment, the QASS system may adjust the threshold dynamically on-line, based, for example, on available computational resources.

Furthermore, it is typically preferred that the smaller number L' is chosen such that the last frame considered during the minimization is a frame with a small number of ancestors, or a frame with a high number of descendants, e.g., an I-frame, or a frame that generally has the largest impact on the expected distortion. For example, the last frame included in the computation of expected distortion within the TX buffer associated with the L' number of frames is an I-frame. This may be determined by having the QASS system keep track of the frame type associated with each data unit in the TX buffer. In some embodiments, the QASS system may determine the frame types of the various data units in the TX buffer and accordingly determine the frames covered by L' over which the QASS process of determining or searching for the target scheduling or transmission pattern are to be applied.

In some embodiments, the searchable space U is applied to this limited number of data units in the TX buffer L', such that L' is small enough such that searching the U searchable space of all possible patterns does not require too much resources. In some embodiments, a set P of scheduling patterns from U is applied to the L' number of data units.

b) Example Method 2: Limit the U Searchable Space to a Smaller P Set Based on Defined Pattern-Selection or Heuristic Rules Another exemplary method to reduce computational complexity is to limit the set of scheduling patterns considered in determining the typically smaller set P. In some embodiments, one or more rules may be applied, for example, to match the computational resources to one of these sets of patterns P. These rules may thus define the set P of patterns, and typically limit the set of scheduling patterns searched or evaluated, for example. The set P may be created by excluding patterns from the U set of patterns, by generating patterns that comply with the rule(s), and/or by selecting patterns from a database. Following are exemplary rules, with some exemplary sub-rules.

To illustrate, Table IIA shows an exemplary scheduling pattern represented as a table of decisions, wherein all the frames in the TX buffer are transmitted, i.e., none are dropped or omitted.

TABLE IIA

Exemplary Pattern with All Frames Transmitted (No Omissions)

| I | B | B | P | B | B | P | B | B | P | B | B | P | B | B | I | B | B | P | B | B | P | B | B | P | B | B | P | B | B | I |
|---|---|---|---|---|---|---|---|---|---|---|---|---|---|---|---|---|---|---|---|---|---|---|---|---|---|---|---|---|---|---|
| 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | i) Exemplary Heuristic Rule 1:

Exclude patterns p that may cause an I-frame or other data units, e.g., intra-coded frames, to be dropped or omitted. This rule translates to evaluating only patterns where each I-frame or intra-coded frame is always transmitted, i.e., $a_i=1$. Table IIB illustrates an exemplary pattern p, representing patterns which may be excluded because of non-compliance with this exemplary rule. Table IIB illustrates that any pattern p, which has an I-frame set to $a_i=0$, i.e., the I-frame is to be dropped or omitted, regardless of the $a_i$ value of the other frames—are excluded from the set P of scheduling patterns.

TABLE IIB

Exemplary Scheduling Pattern p Excluded based on Rule 1

| I | B | B | P | B | B | P | B | B | P | B | B | P | B | B | I | B | B | P | B | B | P | B | B | P | B | B | P | B | B | I |
|---|---|---|---|---|---|---|---|---|---|---|---|---|---|---|---|---|---|---|---|---|---|---|---|---|---|---|---|---|---|---|
| 0 | — | — | — | — | — | — | — | — | — | — | — | — | — | — | 0 | — | — | — | — | — | — | — | — | — | — | — | — | — | — | — | ii) Exemplary Heuristic Rule 2:

Exclude patterns p that may cause a frame or data unit to be transmitted while one or more of its ancestor frames are to be dropped/omitted. Described in another way, consider scheduling patterns wherein a frame may be transmitted only if all of its ancestor frames are also transmitted. Each pattern p included in the set P considers the dependencies between coded video frames, for example. That is, in any patterns, if for any frame i there is an ancestor frame j in $A_i$ with $a_j=0$, then $a_i=0$. For example, the QASS system does not include patterns in this P set that may result in the transmission of a B-frame, wherein one of the P-frames that the B-frame depends upon for successful decoding is marked for dropping or non-transmission. In this example, transmitting the B-frame is typically a waste of channel resources. Consider, for example, a typical 15 frame GOP, with an IBBPBBP . . . structure, the combination of Rule 1 above and Rule 2 reduces the set P of suggested searchable patterns to about 1,364 patterns. Table IIC illustrates two exemplary patterns that are excluded because of non-compliance with exemplary Rule 2.

TABLE IIC

Exemplary Patterns to Be Excluded based on Rule 2

| I | B | B | P | B | B | P | B | B | P | B | B | P | B | B | I | B | B | P | B | B | P | B | B | P | B | B | P | B | B | I |
|---|---|---|---|---|---|---|---|---|---|---|---|---|---|---|---|---|---|---|---|---|---|---|---|---|---|---|---|---|---|---|
| 1 | 1 | 1 | 1 | 1 | 1 | 0 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| 1 | 1 | 1 | 1 | 1 | 1 | 1 | 1 | 1 | 1 | 1 | 1 | 0 | 1 | 1 | 1 | 1 | 1 | 1 | 1 | 1 | 1 | 1 | 1 | 1 | 1 | 1 | 1 | 1 | 1 | 1 |

One of ordinary skill in the art will appreciate that Table IIC and other Tables exemplified herein may not include an exhaustive set or list of patterns.

a) Exemplary Heuristic Rule 2a:

Exclude patterns p from the P set that may cause any data unit or frame to be dropped, while one or more other frames with a higher temporal level may be transmitted. Described in another way, consider scheduling patterns wherein a frame may be dropped only if any other frame with a higher temporal level is also dropped. This exemplary embodiment may be implemented by considering data units for dropping in the reverse order of their temporal level, i.e., from high to low temporal level. For example, for any frame i there is another frame j with lower temporal level with $a_j=0$, then $a_i=0$. In FIG. 4, the I-frames and P-frames 406, 412, 418, 424, 430 in this exemplary stream have a temporal level of "0," which is a lower temporal level than those associated with the B-frames, which are each assigned a temporal level value of "1." If P-frame 412, frame j, is to be dropped, i.e., $a_j=0$, then the B-frames 408, 410, 414, 416 with the higher temporal level of "1" also have to be dropped. Table IID illustrates two exemplary patterns that are excluded because of non-compliance with exemplary Rule 2.

In some embodiments, for a bit stream with I-, P-and B-frames, all B-frames are dropped first before any P-frame is considered for dropping. Exemplary Rule 2a typically results in patterns that form a subset of the set of patterns allowed by Rule 2. The number of searchable patterns provided by this rule may still be considered fairly large. For example, for a 15 frame MPEG-2 IBBPBB . . . structure, the number of scheduling patterns provided in this P set is 1,028.

b) Exemplary Heuristic Rule 2b:

Exclude patterns from the P set that may cause any frame to be dropped while one or more other frames in the same GOP that are later in coding order are scheduled for transmission. Described in another way, consider scheduling patterns wherein a frame may be dropped only if any other frame in the same GOP that is later in coding order is also dropped. In other words, frames are typically considered for dropping in the reverse coding order: starting from the frame in a GOP that is last in coding order, and successively omitting frames earlier in the coding order. For example, in any scheduling pattern, if for any frame i there is another frame j in the same GOP that comes earlier in coding order with $a_j=0$, then $a_i=0$.

Referring to FIG. 4, this exemplary Rule 2b may be exemplified, by having the B-frame 434 with the coding order of "17" being dropped first prior to dropping the B-frame 432 with the coding order of "16" in the same GOP and then dropping the next frame with the highest coding order less than coding order "16." Thus, if in the exemplary pattern p, the B-frame 434 with coding order "17" is set to $a_j=1$, i.e., transmit this B-frame 434, and the next last coded B-frame 432 with coding order "16" is set to $a_i=0$, i.e., drop this B-frame 432, this exemplary pattern is excluded from searchable pattern set P.

In another example, for an MPEG-2 bit stream with IBBPBB . . . structure, the QASS system starts dropping frames at the end of a GOP in the TX buffer, starting from the last frame in the GOP and working towards the front of the GOP. Exemplary Rule 2b may result in scheduling patterns that form a subset of the set of patterns allowed by Rule 2 and typically different from the subset generated by Rule 2a. This exemplary rule may be quite restrictive and provides only a small set P with a

TABLE IID

Exemplary Patterns to Be Excluded based on Rule 2a

| I | B | B | P | B | B | P | B | B | P | B | B | P | B | B | I | B | B | P | B | B | P | B | B | P | B | B | P | B | B | I |
|---|---|---|---|---|---|---|---|---|---|---|---|---|---|---|---|---|---|---|---|---|---|---|---|---|---|---|---|---|---|---|
| 1 | 1 | 1 | 1 | 1 | 1 | 0 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| 1 | 1 | 1 | 1 | 1 | 1 | 1 | 1 | 1 | 1 | 1 | 1 | 0 | 1 | 1 | 1 | 1 | 1 | 1 | 1 | 1 | 1 | 1 | 1 | 1 | 1 | 1 | 1 | 1 | 1 | 1 | small number of patterns. For example, for a 15 frame MPEG-2 IBBPBBP . . . structure, the number of p patterns provided is 15.

iii) Exemplary Heuristic Rule 3:

Among frames that have the same temporal level in the dependency graph, consider frames for dropping in their order in the transmission buffer, i.e., starting from the front or start of the TX buffer, if allowed by their mutual dependencies, i.e., coding dependencies are generally not destroyed. Described in another way, consider scheduling patterns wherein a frame with typically a nonzero temporal level may be dropped only if any other frame with the same temporal level that is earlier in the transmission order is dropped as well. Dropping frames near the front of the transmission buffer has the advantage that more frames that follow may benefit, because fewer packets have to be transmitted to ensure that these later frames arrive on time—prior to their delivery deadline, $t_{d,i}$, thereby reducing the probability that these later frames arrive late. This exemplary rule is typically applied only in cases where exemplary heuristic Rule 2 is not violated. The following sub-rules, 3a and 3b, are specific cases of this general rule.

a) Exemplary Heuristic Rule 3a:

This exemplary rule considers frames with the highest temporal level first for dropping, consistent with Rule 2a above, and then considers frames in that set with the same temporal level strictly in the order in the TX buffer. For example, for a conventional MPEG-2 IBBPB . . . structure, all B-frames in the GOP are considered first for dropping, starting from the B-frame at the front of a GOP and working to the end; subsequently all P-frames are considered for omission, starting from the P-frame at the end of the GOP and working to the front of the GOP. Omission of P-frames typically start at the end of the GOP so as not to violate Rule 2 dependency requirements This exemplary rule typically results in 15 different patterns. Any pattern that does not comply with this exemplary rule is typically excluded from the searchable set of patterns.

b) Exemplary Heuristic Rule 3b:

This exemplary rule generally considers frames with the highest temporal level first for dropping (consistent with Rule 2a above). Furthermore, groups of consecutive frames with the same temporal level are considered for omission in the transmission order of these groups in the TX buffer, while different ordering of the frames within such groups is allowed. Described in another way, consider scheduling patterns wherein a frame that is part of a group of consecutive frames with the same nonzero temporal level may be dropped only if all frames from any other such group of consecutive frames with the same temporal level that is earlier in the transmission order are also dropped. The data units are typically grouped together if they are immediately next to each other in the transmission order and have the same temporal level. This exemplary rule is slightly less restrictive than Rule 3a. For example, for a conventional MPEG-2 IBBPBB . . . GOP structure, the first two B-frames are considered for omission before later B-frames; however, this exemplary rule allows a pattern that may cause the second B-frame in the groups to be dropped first before the first B-frame in that group. This exemplary rule may result in 20 different patterns.

Referring to FIG. 4, for a conventional MPEG-2 IBBPBBP . . . GOP structure, the frames with the highest temporal level in the GOP are considered first for dropping, i.e., those frames with temporal level of "1." All consecutive B-frames are then grouped together, e.g., the first two B-frames 402, 404 are in one group, the next two B-frames 408, 410 are in another group, and so on. In this example, the second B-frame 404 in the group is dropped first, prior to dropping the first B-frame 402.

iv) Exemplary Heuristic Rule 4:

This exemplary rule considers frames with the highest temporal level first for dropping, consistent with Rule 2a above. Furthermore, frames that are marked for dropping/omission with the same temporal level are distributed uniformly across the sequence of frames. Omitting frames in a manner uniformly distributed over the sequence induces a natural kind of temporal scalability. This exemplary rule is advantageous in terms of visual perception, since the exemplary rule minimizes omission of consecutive frames, which may be visually noticeable. This exemplary rule is also advantageous in terms of providing a bit rate reduction in a smoother and more continuous manner, resulting in smaller variations of the bit rate of the resulting sequence over time. The following sub-rule 4a is a specific case of this general rule.

b) Exemplary Heuristic Rule 4a:

This exemplary rule considers frames with the highest temporal level first for dropping, consistent with Rule 2a above. Consecutive frames with the same temporal level are then grouped. The exemplary rule then considers dropping only one (1) frame first from each group of consecutive frames with the same temporal level, then considers dropping two (2) frames next from each group of consecutive frames with the same temporal level, then considers dropping three (3) frames next from each such group, and so on and so forth, with the number of frames being dropped from such groups being increased with each turn, if appropriate. Groups of consecutive frames with the same temporal level in one or two GOPs are considered for dropping/omission in the order of these groups in the transmission buffer, e.g., consistent with exemplary Rule 3. Described in another way, consider scheduling patterns wherein the number of dropped frames in a group of consecutive frames with the same nonzero temporal level is always the same or one higher than the number of dropped frames in any other such group that is later in transmission order. This means that the number of data units or how many data units are dropped increases among groups of consecutive frames.

FIGS. 8A, 8B, 8C, 8D, 8E, 8F, 8G, 8H, and 8I illustrate exemplary tables 810, 820, 830, 840, 850, 860, 870, 880, 890 with each table containing sample scheduling patterns p for a video bit stream with I-, P-, and B-frames in a conventional IBBPBBPBBPBBPBB GOP structure. The GOP parameters are (15, 3), i.e., the GOP length is 15 frames with every third frame a non-B-frame. A "1" under the frame type indicates the frame is to be transmitted, i.e., $a_i=1$, while a "0" indicates that frame is to be dropped, i.e., $a_i=0$. The number in the first column of each table 812, 822, 832, 842, 852, 862, 872, 882, 892 indicates the pattern number. The exemplary patterns in FIGS. 8A-8I are ordered in coding order from left to right, similar to the order they are typically in the TX buffer and the order they are typically transmitted. Data units farther to the right typically correspond to frames with later delivery deadlines, $t_{d,i}$. The exemplary patterns illustrate two GOPs of an exemplary video bit stream or all frames up to the third I-frame in the future or which may arrive later in time in the TX buffer.

The first row in each exemplary table indicates the coding type of the frame and underneath the coding type or frame type is the scheduling decision of the pattern indicating whether such frame is to be calculated or evaluated as being transmitted ("1") or omitted/dropped ("0"). Each row following the first row is associated with a pattern p. For example, the first frame entry, i.e., the second column, after the pattern number column, corresponds to the transmit/omit decision for an I-frame 814. The I-frame 814 is also exemplified at the start or front of the TX buffer. The second frame entry from the left in each pattern corresponds to a B-frame 816, and so on. The patterns in these exemplary tables may apply exactly as shown typically only if the current frame at the front of the transmission buffer is an I-frame (first frame of a GOP). However, similar patterns may apply when the current frame is not an I-frame. The patterns, however, may be adjusted to mimic what frames are in the TX buffer. Generally, the patterns for the third GOP, fourth GOP, and so on form subsets of the patterns exemplified in FIGS. 8A-8I.

Although exemplified herein using the IBBP structure with N=15 and M=3, the embodiments of the present invention may apply to various GOP structures and to other coding standards. Furthermore, the patterns p that may be generated or considered typically depend on the GOP structure format, size of the TX buffer, and the like. FIGS. 8A-8I do not contain an exhaustive list of patterns. Duplicate patterns may have been eliminated.

FIG. 8A shows an exemplary scheduling pattern 810 indicating that all frames are to be transmitted, i.e., no data units or frames are to be dropped. FIG. 8B shows ten exemplary patterns 820, pattern 1 to pattern 10 822, indicating that B-frames are to be successively dropped starting from the first GOP starting from the start or front of the TX buffer. Furthermore, the first B-frame in every pair or group of B-frames is omitted first, followed by the second B-frame in every pair. B-frames in the first GOP are typically dropped in their order in the TX buffer.

FIG. 8C shows ten exemplary patterns 830 indicating that B-frames are to be successively dropped starting from the second GOP starting from the front of the TX buffer, unlike FIG. 8B—which drops from the first GOP. Similar to FIG. 8B, the exemplary patterns 830 show that the first B-frame in every pair of B-frames is omitted first, followed by the second B-frame in every pair. B-frames in the second GOP are typically dropped in their order in the TX buffer. All B-frames in the first GOP in these exemplary patterns are all omitted.

Figure 8D:
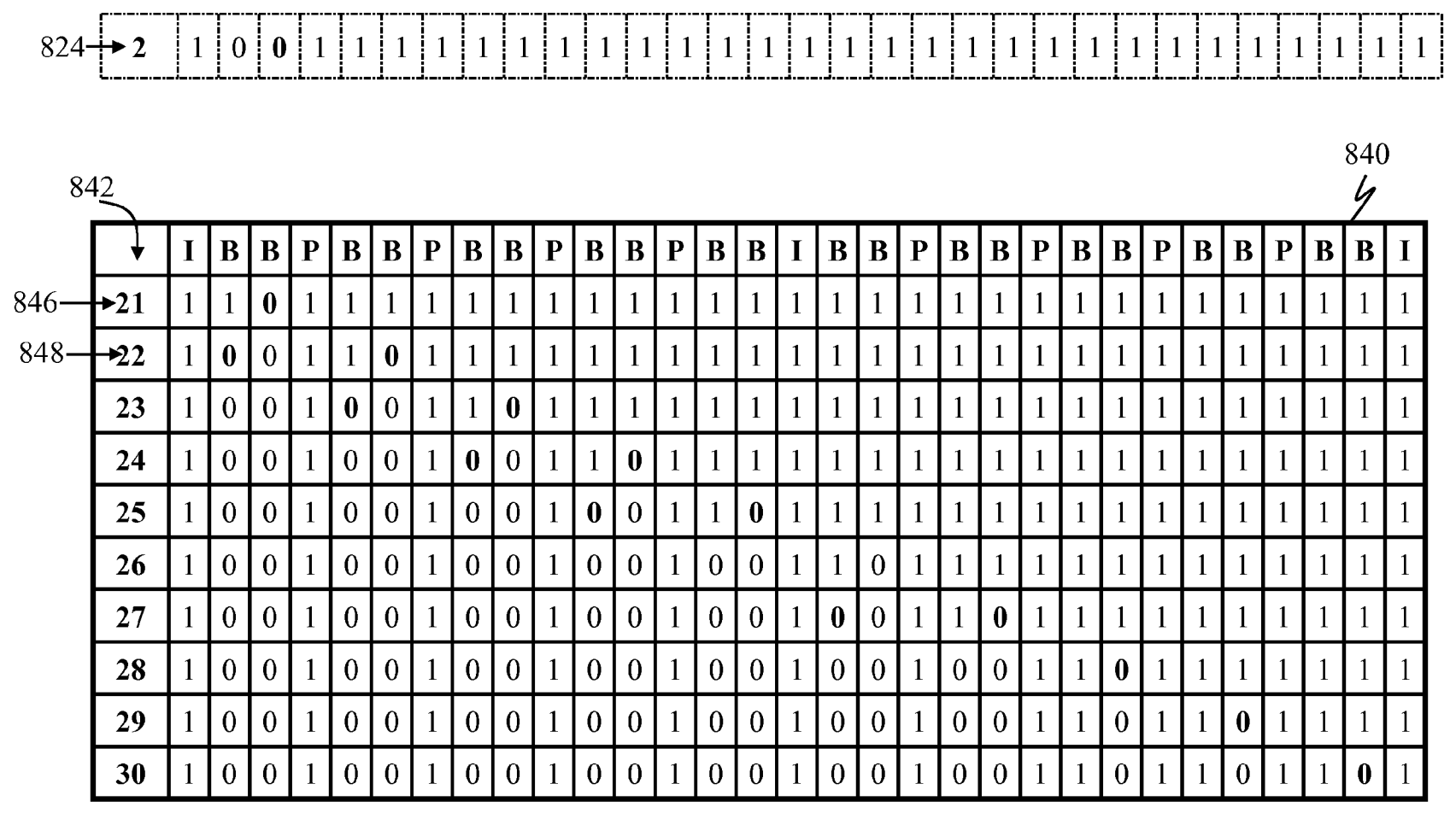

FIG. 8D shows ten exemplary patterns 840 that successively drop B-frames from the first and second GOP, starting from the front of the TX buffer and starting from the first GOP. In these patterns, the second B-frame in the B-frame pair is successively dropped, and B-frame(s) in groups or pairs of B-frames prior or earlier in the TX buffer than the B-frame identified to be dropped are also omitted/dropped as shown. For example, in the row 846 identified with pattern number "21," the second B-frame in the first B-frame pair is indicated to be dropped—i.e., "0." In the next row 848 or pattern "22," the second B-frame in the second B-frame pair is indicated to be dropped and both B-frames in the first B-frame pair are also accordingly dropped. Described in another way and as shown, the second B-frame is dropped first before the first B-frame in a B-frame pair, but only after all B-frames in earlier pairs have been dropped. This exemplary table 840 follows Rule 3b. In general, following Rule 3b strictly results in at least a pattern 824 define after pattern 21 846 and before pattern 22 848. This "missing" pattern 824, however, is not shown as part of the exemplary table 840, considering that this pattern already exists as pattern 2 824 included in the exemplary table 820 of FIG. 8B. Duplicate patterns, typically provided in earlier figures, are generally not shown in FIGS. 8A-8I FIG. 8E shows nine exemplary scheduling patterns 850 that successively omit B-frames from the first and second GOP, starting from the front of the TX buffer. Only the first B-frame of every B-frames pair is omitted, i.e., each second B-frame in every B-frames pair is transmitted.

FIG. 8F shows nine exemplary patterns 860 that successively omit B-frames from the first and second GOP, starting from the front of the TX buffer. Only the second B-frame of every B-frames pair is omitted, i.e., each first B-frame in every B-frames pair is transmitted.

Figures 8G, 8H:
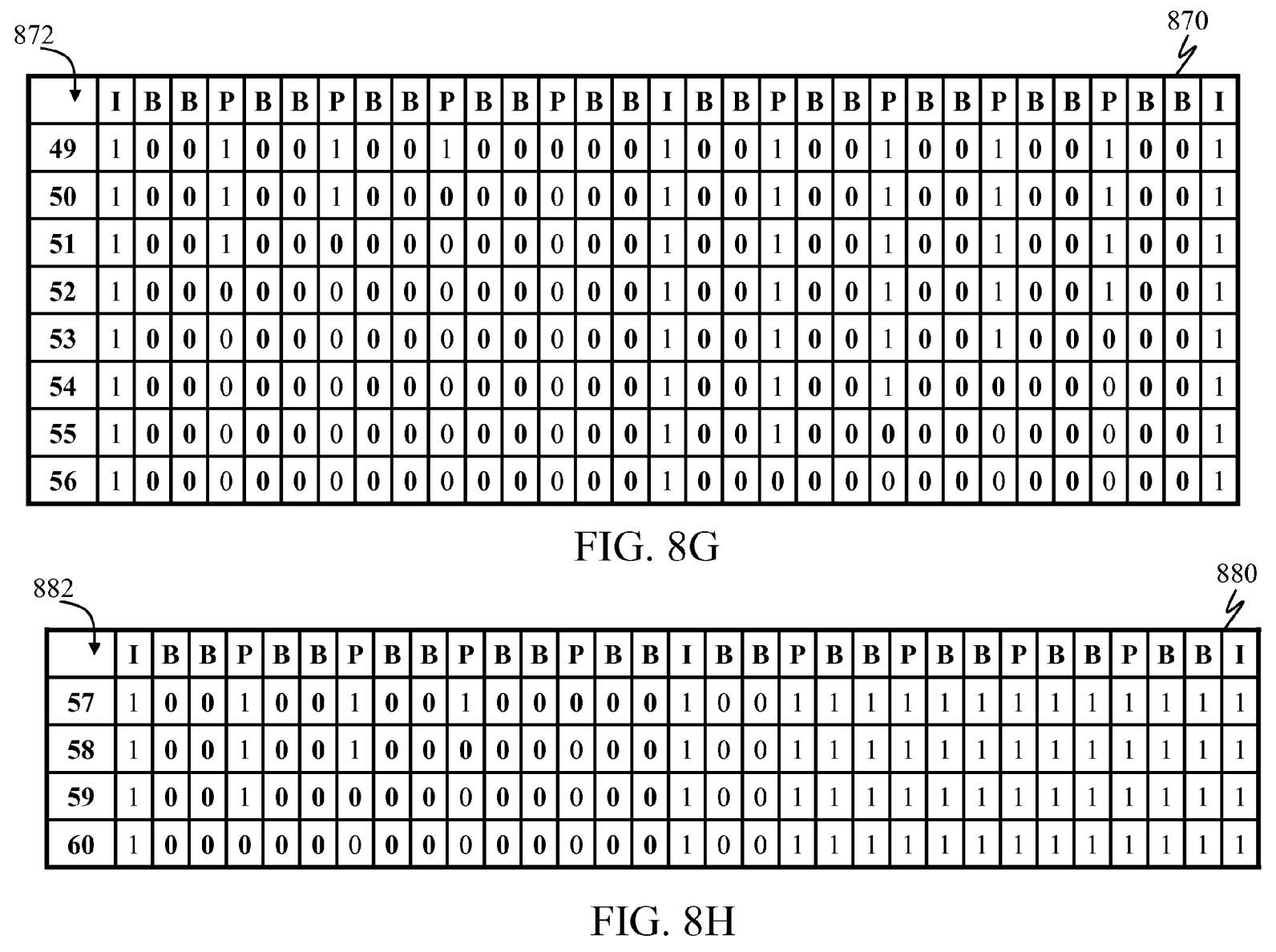

FIG. 8G shows eight exemplary scheduling patterns p 870 that omit all B-frames from the first and second GOP, and that also successively drop P-frames from the first and second GOP in order of their dependencies-from least to most dependencies, starting from the first GOP at the front of the TX buffer and then to the second GOP.

FIG. 8H shows four exemplary patterns p 880 that drop all B-frames in the first GOP that depend on P-frames, and which also successively drop P-frames from the first GOP in order of their dependencies-from least to most dependencies.

FIG. 8I shows fourteen exemplary patterns 890 that successively drop a B-frame or a P-frame from the first GOP, starting at the end of the first GOP and working towards the front of the TX buffer. The frames successively dropped are in reverse coding order, as exemplified.

Using the above exemplary Rules 1-4, including their sub-rules, several exemplary sets of scheduling patterns may be defined for an exemplary bit stream with an IBBPBB . . . structure, with length N=15, and M=3, as exemplified in FIGS. 8A-8I. In some embodiments, there may be three searchable pattern sets P, which we refer to as $P^{MIN}$, $P^{BASE}$, and $P^{EXT}$.

$P^{MIN}$: The $P^{MIN}$ set may be a minimal set of scheduling patterns that are consistent with exemplary Rules 1, 2a, and 3a. This exemplary set typically contains patterns that only consider frames in the TX buffer starting from the start/front up to and including the next I-frame that follows in the TX buffer queue, i.e., approximately about one (1) GOP. An exemplary $P^{MIN}$ set may include patterns similar to the patterns listed in exemplary tables 810, 820, 880 in FIGS. 8A, 8B and 8H.

$P^{BASE}$: In some embodiments, the $P^{BASE}$ is a base set of scheduling patterns consistent with exemplary Rules 1, 2a, and 3a. This exemplary set may contain patterns that typically consider frames in the TX buffer starting from the start/front up to and including the second I-frame that follows after the first frame in the TX buffer queue, i.e., approximately about two (2) GOPs. The patterns in this exemplary set are similar to the patterns listed in exemplary tables 810, 820, 830, 870, 880 in FIGS. 8A, 8B, 8C, 8G, and 8H.

$P^{EXT}$: In some embodiments, the $P^{EXT}$ is an extended set of scheduling patterns consistent with exemplary Rules 1, 2a, 2b, 3a, 3b, and 4a. This extended set may contain patterns that typically consider frames in the TX buffer starting from the front up to and including the second I-frame that follows after the first frame in the TX buffer queue, i.e., approximately about two (2) GOPs. The patterns in this exemplary set are exemplified in exemplary tables 810, 820, 830, 840, 850, 860, 870, 880, 890 in FIGS. 8A-8I.

One of ordinary skill in the art will appreciate that the exemplary sets of transmission patterns discussed herein are provided for illustrative and exemplification purposes. These sets may be varied and yet still be in the scope of the present invention.

Defining P Sets:

One of ordinary skill in the art will appreciate that there are many ways to define or determine the P sets. In some embodiments of the invention, the QASS system is adapted to select from a set of predefined and/or generated scheduling patterns, which, for example, may be stored in a database. These patterns may also have been user-defined or programmatically created and stored accordingly. In some embodiments, the determination of the P sets may be under user control or under the control of a set of program instructions such that the P set to be used in determining the target transmission pattern is dynamically and programmatically generated. In some embodiments, generally depending on data structure, the $P^{MIN}$, $P^{BASE}$, and/or $P^{EXT}$ sets of scheduling patterns are predefined and stored in a database, for example. In some embodiments, different sets of scheduling patterns, for example $P^{MIN}$, $P^{BASE}$, and/or $P_{EXT}$ may be generated dynamically by invoking different program instructions, for example. The system may then be configured to select which set from the sets of $P^{MIN}$, $P^{BASE}$, and $P^{EXT}$ is going to be evaluated in determining the target transmission pattern, which may be based on resources available.

For transmission of bit streams with conventional 15 frame IBBPBBP . . . GOP structure, for example, the QASS system may apply $P^{MIN}$, $P^{BASE}$, or $P^{EXT}$ of scheduling patterns. Experiments conducted by the Applicant have shown that a QASS system that utilizes sets of scheduling patterns constructed on the basis of the pattern-selection/heuristic rules defined above has a performance that may be very close to a system that utilizes exhaustive search over all scheduling patterns U, which at least obey the dependencies between frames. Furthermore, the computational complexity may be reduced significantly by utilizing one of these limited P sets, as defined by the pattern-selection rules above. Depending on the amount of computational resources available, the expected channel conditions, and other design considerations, one of these sets of scheduling patterns, $P^{MIN}$, $P^{BASE}$, or $P^{EXT}$, may be selected or determined so as to minimize the searchable pattern sets U to a smaller set P.

Furthermore, note that the above exemplary sets are hierarchically structured, such that one set is a subset of another set:

$$P^{MIN} \subset P^{BASE} \subset T^{EXT} \subset U.$$

Therefore, the number of patterns in these sets ranges from small to large:

$$|P^{MIN}| < |P^{BASE}| < |P^{EXT}| < U|.$$

In some embodiments, the QASS system is adapted to apply more than one set P of transmission patterns, in such a manner that the system is able to switch between the different P sets. By having more than one P set, the system provides for complexity scalability, wherein the system may apply a smaller set of patterns, for example, when fewer computational resources are available and apply a larger set of patterns when more computational resources are available.

In general, the available computational resources may be determined or estimated in a number of ways. For example, the QASS system may allocate a certain or defined amount of time for the QASS process to determine or search for the target scheduling pattern. If the system detects that the search for this target scheduling pattern is taking more time than the allocated amount of time—e.g., based on a threshold value, the system may assume or designate that the available computational resources are low. The QASS system may furthermore decide to utilize a set P that contains fewer patterns, than the previous set PI so as enable a search for the target pattern that may potentially be completed in a shorter amount of time, given the computational resources available at that time. On the other hand, if the system detects that the search for the target scheduling pattern is taking substantially less time than the allocated amount of time—e.g., based on a threshold value, the system may designate or assume that the available computational resources are plenty. The QASS system may then decide to utilize a set P that contains more patterns, than the previous set P, potentially resulting in improved performance. If the system detects that the search for the target scheduling pattern is taking approximately the allocated amount of time or slightly less time, the system may decide to retain the set P that the QASS system is applying at that time. Hence, the QASS system may adaptively determine a set P that may be appropriate given the computational resources available to the system at given times.

Early Rejection Process/Partial Pattern Distortion Search or Calculation:

In another embodiment, computational complexity may be reduced by minimizing Equation (1) above, which is $$p^* = \underset{p \in P}{\operatorname{argmin}} \Delta D(p) = \underset{p \in P}{\operatorname{argmin}} \left( \sum_{i=m}^{m+L-1} E_i(p) \cdot \Delta d_i \right),$$

without any substantial impact on the outcome by applying an early rejection technique, herein also referred to as a partial distortion calculation or search method. This embodiment is based on the following observations.

As described above, the minimization procedure essentially consists of computing, for each pattern p, the expected increase in distortion, equivalently to the decrease in quality, over the frames in the buffer under consideration $\Delta D(p)$—i.e., a pattern distortion value for a particular pattern p, and selecting the pattern with minimum expected increase in distortion. In some embodiments, while iterating over the patterns, the QASS system may be adapted to keep track of the minimum expected increase in distortion $\Delta D_{MIN}$, for all patterns evaluated so far.

Furthermore, for each pattern, the system accumulates contributions to the expected increase in distortion from the L frames under consideration in the TX buffer (see Eq. (1)). It may happen that, for a particular pattern, the intermediate value of the expected increase in distortion that has accumulated from contributions from J<L frames is already higher than the minimum expected increase in distortion for all patterns tried so far $\Delta D_{MIN}$. In that case, it may be concluded immediately that the pattern being evaluated is not the pattern with the minimum expected distortion. Therefore, the QASS system need not evaluate and accumulate contributions to the distortion from the remaining L-J frames, since the total expected distortion for that pattern is expected to increase.

In this embodiment, a pattern may be rejected on the basis of a partial distortion value, and that in many cases the distortion value need not be accumulated over all frames for each pattern. Furthermore, the system may enhance the order in which the different transmission patterns are tried to increase the effectiveness of the partial distortion search method. This order should be such that patterns that are most likely to result in a low distortion are evaluated first. When the patterns that are evaluated early in the search result in a relatively low minimum distortion $\Delta D_{MIN}$ (the minimum so far in the search), it is more likely that patterns that are evaluated later in the search may be rejected sooner, as the distortion value being accumulated for these patterns may exceed the minimum distortion found so far ($\Delta D_{MIN}$) sooner. For example, it was found empirically that the pattern that transmits all frames, no omissions, is selected as the target transmission pattern relatively often, in a few experimental scenarios involving transmission of MPEG-2 video over IEEE 802.11 wireless links. Therefore, this particular pattern often results in the minimum expected distortion. Therefore, it is advantageous to evaluate this pattern at the start of the search or evaluation of all patterns in the P set, since it is more likely to result in a low $\Delta D_{MIN}$ value, thereby resulting in earlier rejection of other patterns using the partial distortion search method.

Furthermore, another technique may be utilized to increase the effectiveness of the partial distortion search method.

When accumulating the expected distortion increase $\Delta D(p)$ for a particular pattern p over the frames considered, it is advantageous to accumulate the largest contributions first. In this manner, the intermediate expected distortion increase value may exceed the current minimum $\Delta D_{MIN}$ sooner. Therefore, any non-optimal or potentially non-target pattern may be rejected faster using this technique. In some embodiments, it may be difficult to predict which frames have the largest contribution to the distortion $\Delta D(p)$. For a particular pattern, the contribution of a frame that is transmitted depends both on the value of $\Delta d_i$ and the probability of arriving late. However, the contribution of a frame that is omitted is simply $\Delta d_i$ which is non-zero. Therefore, in some embodiments, it may be advantageous to accumulate the contributions to the distortion of all frames that are omitted before accumulating the contributions of all frames that are transmitted, for a particular pattern. In other embodiments, the omitted frames with the highest distortion value, such as based on the $\Delta PSNR$, may be evaluated first followed by the next omitted frame with the next highest $\Delta PSNR$ value. Experiments conducted by the Applicant have shown that by applying the partial distortion search, the number of computations during the search for the target scheduling or transmission/omission pattern may easily be reduced by as much as 30%-50%, without altering the outcome.

By limiting the number of frames in the TX buffer considered during calculation of expected distortion, the number of computations may be reduced by a similar degree, with typically very minor impact on the outcome. Furthermore, by limiting the number of patterns considered during the search, using the above exemplary rules, the number of computations in some cases may be reduced by more than 99% compared to exhaustive searches or evaluations.

Figure 9A:
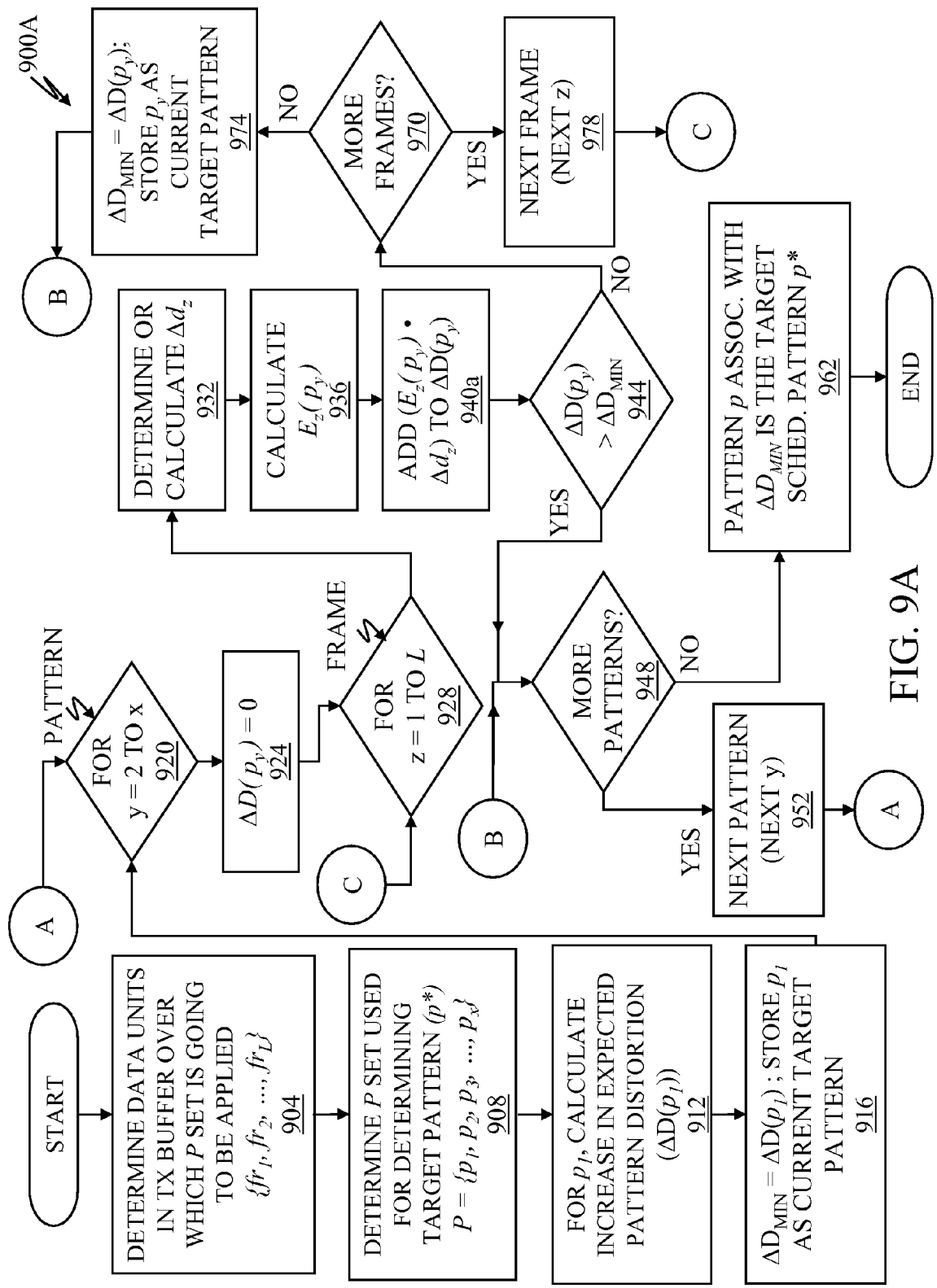
FIG. 9A is a flowchart of an exemplary early rejection or partial distortion calculation, according to an embodiment of the invention.

FIG. 9A is a flowchart of an exemplary partial distortion calculation 900A, according to an embodiment of the invention. In general, these embodiments may apply when the patterns are predefined patterns, e.g., stored in tables. Variations of such exemplary processes are expected and still be in the scope of the present invention. In the first operation, the QASS process in general determines the data units over which the P set of scheduling patterns p are to be applied (step 904). The number of data units, in this example, frames under consideration is L, starting from the front of the TX buffer. The frames under consideration are represented by $\{fr_1, fr_2, \ldots, fr_L\}$.

The P set is then determined (step 908) based on typically whether the $p^{MIN}$, $p^{BASE}$, or $p^{EXT}$ of that data or video structure is to be applied. The determination may be based on conditions described herein, e.g., computational resources. In this example, the P set contains x number of patterns, represented by $\{p_1, p_2, \ldots, p_x\}$. The expected pattern distortion value for all frames under consideration based on the transmission/omission decisions indicated by the first pattern pi is then calculated, and represented by $\Delta D(p_1)$ (step 912). The $\Delta D(p_1)$ value is then stored in a variable called $\Delta D_{MIN}$ (step 916), which in general keeps track of the minimum pattern distortion value calculated so far in the process. The pattern $p_1$ associated with the $\Delta D_{MIN}$ is also typically recorded, for example, in another storage location (step 916). As described above, a pattern distortion value, in general, is based on the accumulation of the distortion value of each frame based on a pattern applied.

The next pattern from the P set is then evaluated (step 920). As mentioned above, the patterns in the P set may be ordered in a certain way so as to obtain a pattern which may potentially result to a pattern providing a minimum or a smaller distortion value to enhance the early rejection process/partial distortion calculation process. The frames under consideration represented by $\{fr_1, fr_2, \ldots, fr_L\}$, as described above may also be ordered based on conditions described herein. The frames are then evaluated to determine the frame distortion contribution that each frame omitted may add to the total pattern distortion value based on the pattern p applied. An intermediate pattern distortion value or variable that is keeping track of distortion increment frame by frame based on the pattern being evaluated, $\Delta D(p_y)$ is set to zero (step 924). The frames are typically processed one by one (step 928). The $\Delta d_z$ of the frame being evaluated is then calculated or determined (step 932). As described above, the $\Delta d_z$ may be based on a lookup of a PSNR distortion table, e.g., exemplified in FIG. 7. In some embodiments, such a value is calculated using the bit rate of the video stream and by utilizing a logarithmic relationship between the distortion increment and the bit rate, as described above. The probability that the frame, $fr_z$, is not going to be decoded properly, $E_z(p_y)$, is then calculated as described herein (step 936). The intermediate value of $(E_z(p_y) \cdot \Delta d_z)$ is then added to the variable $\Delta D(p_y)$, which typically accumulates the distortion increment frame by frame (step 940), and a check is then made whether at this point of the evaluation, $\Delta D(p_y)$ is greater than $\Delta D_{MIN}$ (step 944).

If $\Delta D(p_y)$ is not greater than $\Delta D_{MIN}$ (step 944, "no" branch) and there is at least one more frame to evaluate (step 970), the next frame is evaluated (step 978) as shown. Typically, this process in general entails determining the increment in distortion for the next frame which is then accumulated also in the $\Delta D(p_y)$ variable. On the other hand, if there are no more frames to evaluate, the current value of $\Delta D(p_y)$ is then stored as the $\Delta D_{MIN}$ value (step 974), indicating that at this processing stage, the pattern $p_y$ associated with the $\Delta D_{MIN}$ and the current $\Delta D(p_y)$ is the target scheduling pattern evaluated so far. The pattern $p_y$ associated with the current $\Delta D_{MIN}$ is also stored (step 974). The next pattern, if available, is then evaluated as shown.

If $(\Delta D(p_y) > \Delta D_{MIN})$ (step 944, "yes" branch), then the rest of the frames are skipped, i.e., not evaluated for this pattern. If there is another pattern in P to be evaluated (step 948), the next pattern is then evaluated (step 952) and the frames under consideration also accordingly evaluated, as shown. On the other hand, if there are no more patterns in P to be evaluated, the pattern p associated with the $\Delta D_{MIN}$ value is deemed the target scheduling pattern p* (step 962). The first data unit, in this example, $fr_1$ is then transmitted or not, based on the transmission/omission decision associated with that first data unit in the p*. This general process may then be repeated at the next transmission opportunity.

Figure 9B:
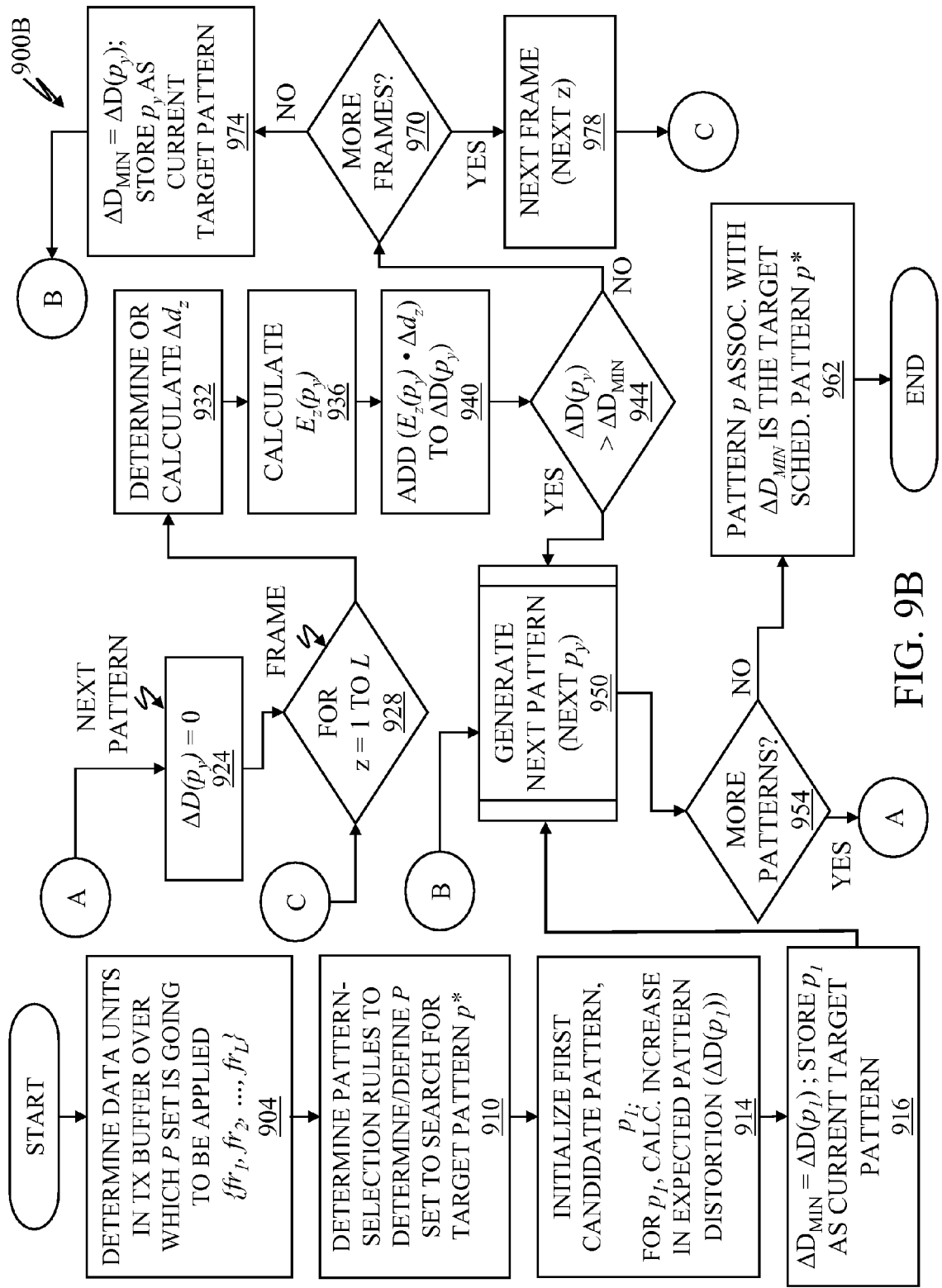
FIG. 9B is a flowchart of another exemplary early rejection or partial distortion calculation similar to FIG. 9A, but applying dynamically generated candidate transmission/omission patterns, according to an embodiment of the invention.

FIG. 9B is a flowchart of another exemplary partial distortion calculation 900B, similar to FIG. 9A with some variations, and particularly applicable to embodiments where patterns are dynamically generated as part of the QASS process, according to an embodiment of the invention. Generally, operations in FIG. 9B that are similar to those in FIG. 9A are labeled with the same reference number. Variations of such exemplary process are expected and still be in the scope of the present invention. The exemplary process 900B may apply when heuristic Rules 1, 2a, and 3a, as described above, are applied to a video stream consisting of I-, P- and B-frames, wherein the B-frames are non-hierarchical B-frames.

In the first operation, the QASS process in general determines the data units over which the P set of scheduling patterns p are to be applied (step 904). The number of data units, in this example, frames under consideration is L, starting from the front of the TX buffer. The frames under consideration are represented by $\{fr_1, fr_2, \ldots, fr_L\}$.

In the next operation, the one or more heuristic rules to be applied are then determined (step 910). Based on these rules determined or decided to be applied, the set P of candidate frames may be dynamically generated. At this point, the candidate patterns making up set P are not known. The candidate patterns in this exemplary process 900B are dynamically generated and from these generated candidate patterns, the target pattern p* is going to be determined. The determination of which rules to apply may be based on conditions described herein, e.g., computational resources.

In the next operation, a first or initial pattern $p_1$ is defined. In general, the candidate pattern generation process generates candidate transmission or scheduling patterns for the TX buffer at time $t_m$ represented by the vector $p_m=[a_m, a_{m+1}, a_{m+2}, \ldots, a_{m+L-1}]$, where each $a_j$ is associated with a video frame and indicates whether the frame is marked for transmission—$a_j=1$, or omission—$a_j=0$. An initialization process is typically performed, which may include setting all $a_j$ in the vector, representing the frames in the TX buffer, to 1, thereby indicating that all frames in the initial set of candidate patterns are all marked for transmission.

In this exemplary embodiment, the initial candidate pattern is a pattern where all frames in the TX buffer are set for transmission. Based on this initial or first pattern, the expected pattern distortion value for all frames under consideration based on the transmission/omission decisions indicated by the first pattern $p_1$ is then calculated, and represented by $\Delta D(p_1)$ (step 914). The $\Delta D(p_1)$ value is then stored in a variable called $\Delta D_{MIN}$ (step 916), which in general keeps track of the minimum pattern distortion value calculated so far in the process. The pattern $p_1$ associated with the $\Delta D_{MIN}$ is also typically recorded, for example, in another storage location (step 916). As described above, a pattern distortion value, in general, is based on the accumulation of the distortion value of each frame based on a pattern applied. The next pattern for evaluation is then dynamically generated, $p_y$, via a candidate pattern generation (CPG) process (step 950). The finer details of an exemplary CPG process are discussed in FIGS. 10A and 10B. Similar to candidate patterns that are stored in lookup tables, the dynamic generation of candidate patterns in this exemplary process may be ordered in a certain way so as to obtain a pattern which may potentially result to a pattern providing a minimum or a smaller distortion value to enhance the early rejection process/partial distortion calculation process. The frames under consideration represented by $\{fr_1, fr_2, \ldots, fr_L\}$, as described above may also be ordered based on conditions described herein.

If another candidate pattern is returned by the CPG process (step 954, "yes branch"), that pattern is evaluated. The frames are then evaluated to determine the frame distortion contribution that each frame omitted may add to the total pattern distortion value based on the dynamically generated pattern, $p_y$, applied. An intermediate pattern distortion value or variable that is keeping track of distortion increment frame by frame based on the dynamically-generated pattern, $p_y$, being evaluated, $\Delta D(p_y)$ is set to zero (step 924). The frames are typically processed one by one (step 928). The $\Delta d_z$ of the frame being evaluated is then calculated or determined (step 932). As described above, the $\Delta d_z$ may be based on a lookup of a PSNR distortion table, e.g., exemplified in FIG. 7. In some embodiments, such value is calculated using the bit rate of the video stream and by utilizing a logarithmic relationship between the distortion increment and the bit rate, as described above. The probability that the frame, $fr_z$, is not going to be decoded properly, $E_z(p_y)$, is then calculated as described herein (step 936). The intermediate value of $(E_z(p_y) \cdot \Delta d_z)$ is then added to the variable $\Delta D(p_y)$, which typically accumulates the distortion increment frame by frame (step 940), and a check is then made whether at this point of the evaluation, $\Delta D(p_y)$ is greater than $\Delta D_{MIN}$ (step 944).

If $\Delta D(p_y)$ is not greater than $\Delta D_{MIN}$ (step 944, "no" branch) and there is at least one more frame to evaluate (step 970), the next frame is evaluated (step 978) as shown. Typically, this process in general entails determining the increment in distortion for the next frame which is then accumulated also in the $\Delta D(p_y)$ variable. On the other hand, if there are no more frames to evaluate, the current value of $\Delta D(p_y)$ is then stored as the $\Delta D_{MIN}$ value (step 974), indicating that at this processing stage, the pattern $p_y$ associated with the $\Delta D_{MIN}$ and the current $\Delta D(p_y)$ is the target scheduling pattern evaluated so far. The pattern $p_y$ associated with the current $\Delta D_{MIN}$ is also stored (step 974). The CPG process is then invoked (step 950) to generally obtain a new candidate pattern or receive an indication that no more candidate patterns are available. The pattern evaluation process to determine the distortion value is then performed again for the generated candidate. If there are no more patterns in P to be evaluated, the pattern p associated with the $\Delta D_{MIN}$ value is deemed the target scheduling pattern p* (step 962). The first data unit, in this example, $fr_1$ is then transmitted or not, based on the transmission/omission decision associated with that first data unit in the p*. This general process may then be repeated at the next transmission opportunity.

If $\Delta D(p_y)$ is greater than $\Delta D_{MIN}$ (step 944, "yes" branch), then the rest of the frames are skipped. The CPG process is then invoked (step 950) to obtain a new candidate pattern or receive an indication that no more candidate patterns are available. If a pattern is available (step 954, "yes" branch), the process continues as shown and as discussed above. If no pattern is available (step 954, "no" branch), the pattern p associated with the $\Delta D_{MIN}$ value is then deemed the target scheduling pattern p* (step 962).

Generating Transmission/Omission or Scheduling Patterns:

As mentioned above, the patterns forming the set P, and, in some embodiments, may be programmatically generated, even dynamically, so as to enable the QASS system, for example, to flexibly adapt to the data structure of the data units to be processed. Although transmission patterns may be stored in lookup tables, it may be more desirable to determine the set of transmission patterns P in a flexible manner. Providing for programmatic-generation of patterns to enable the QASS system to handle various different GOP structures, i.e., various sequences of I-, P-, and/or B-frames. Moreover, the GOP structure may vary over time within the same video stream, and/or the GOP structure may also be an irregular structure, thus a programmatic generation of the patterns may provide flexibility. Considering also that the number of frames in the transmission buffer and their coding/frame types may vary over time, the set of transmission patterns that may be applied given the data units or frames in the buffer also has to accordingly vary. A manner of adjusting to such changing conditions may be beneficial. In some embodiments, the QASS system may increase or decrease the size of the set P. i.e., increase or decrease the number of patterns in the set P, for example, based on computational resources available. By having the QASS system generate the transmission patterns, the set P may be flexibly adjusted and generated. The candidate transmission patterns are generated typically based on the heuristic rules determined or defined to be applied.

The QASS system may determine the actual set P of transmission patterns in a programmatic manner, based on the video frames present in the transmission buffer at the time of the transmission opportunity. The generation of the set P may also be generated in a computationally efficient manner, for example, with a minimum number of passes over the frames in the transmission buffer and/or with a minimum amount of bookkeeping and memory required.

As mentioned above, the candidate pattern generation process generates candidate transmission or scheduling patterns for data units in the TX buffer at time $t_m$ represented by the vector $p_m=[a_m, a_{m+1}, a_{m+2}, \ldots, a_{m+L-1}]$. An initialization process is typically performed, which may include setting all $a_j$ in the vector, representing the frames in the TX buffer, to 1, thereby indicating that all frames in the initial set of candidate patterns are all marked for transmission (for example, as shown in step 914).

In general, the next transmission patterns are generated by successively marking frames for omission. The CPG process may be invoked repeatedly while the QASS system is searching for the target pattern. Furthermore, the CPG process iteratively processes the frames in the TX buffer from front to back. While reading/processing the frames, the CPG process, in some embodiments, employs a simple finite state machine (FSM), which keeps track of a state, and may change the state depending on the current state and the characteristics of the video frames so far encountered or processed in the TX buffer.

Figure 10A:
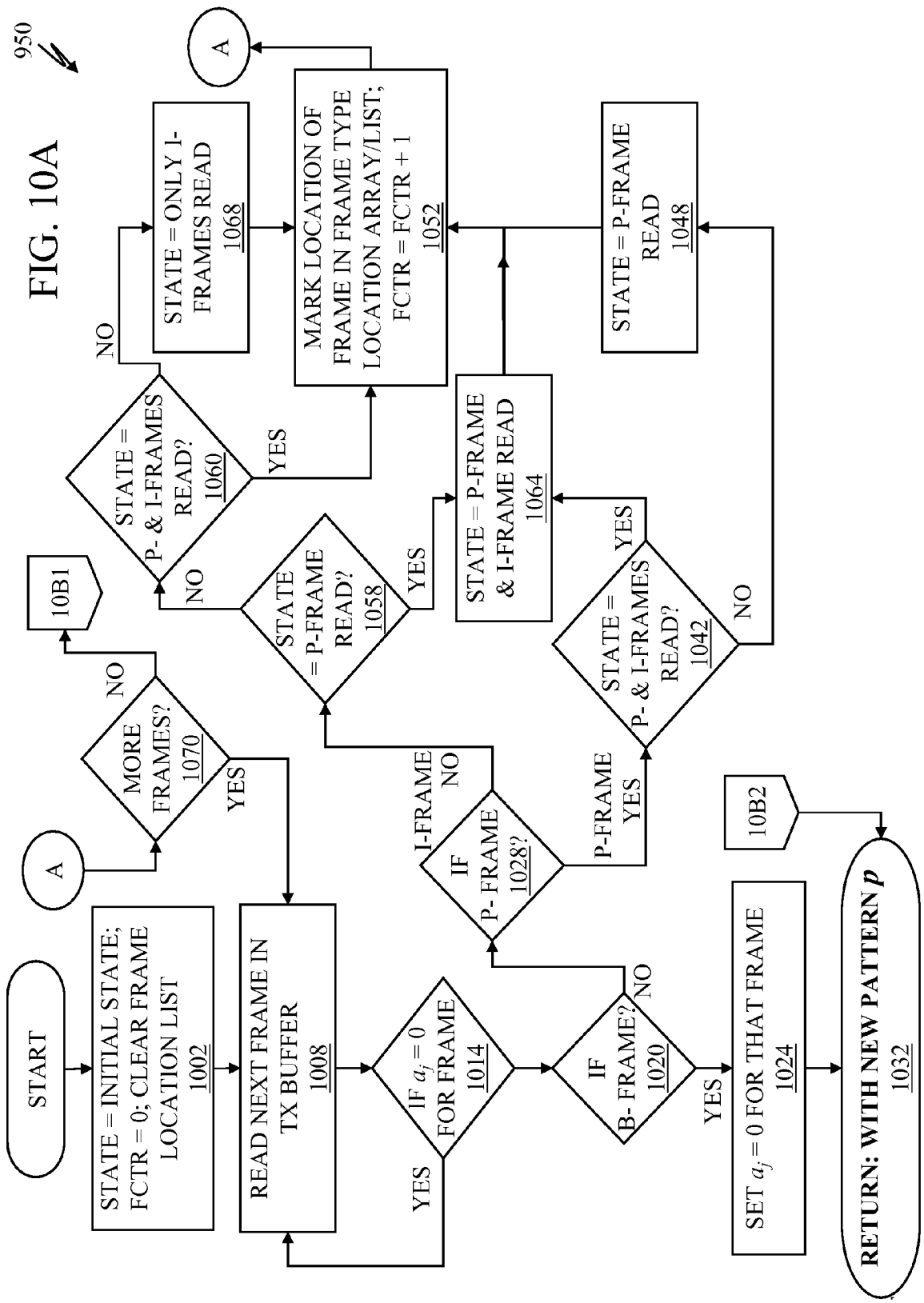
FIGS. 10A and 10B together contain a flowchart showing an exemplary candidate pattern generation process implementing some of the exemplary heuristic rules, according to an embodiment of the invention.
Figure 10B:
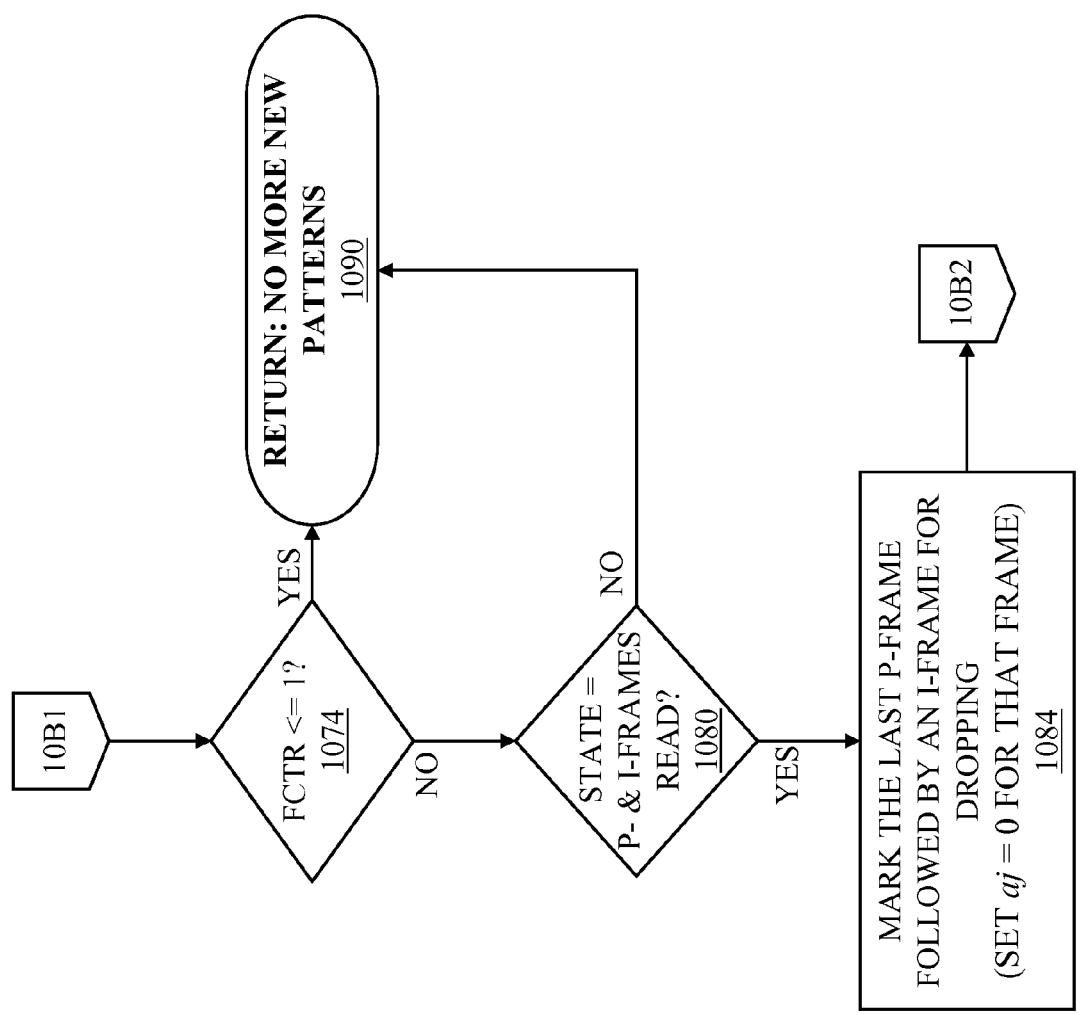

FIGS. 10A and 10B together illustrate an exemplary CPG process 950, according to an embodiment of the invention, based on the determination that heuristic Rules 1, 2a, and 3a are applied to generate the appropriate set P. One of ordinary skill in the art will appreciate, that the CPG process disclosed in FIGS. 10A and 10B, for example, may be modified depending on the set of heuristic rules applied to define the set P. Variations on the manner of generating candidate patterns are expected and still be in the scope of the present invention.

In general, the CPG process performs some initialization operations (step 1002). For example, the FSM starts out in an initial state, e.g., "State=Initial State" (step 1002). Also, a variable, e.g., frame counter (FCTR), is initialized for counting the number of frames in the TX buffer not yet marked for omission, i.e., counting the frames in the TX buffer that are at that point scheduled for transmission, e.g., FCTR=0 (step 1002). An array keeping track of the location of P-frames and I-frames read by the CPG process may be initialized, e.g., clearing or resetting the frame location array or list (FLL) (step 1002). The FLL may keep track of the location of the frame and the frame/coding type of that frame. Starting from the front of the TX buffer, the first frame under consideration at the front of the TX buffer is read (step 1008). In general, the CPG process skips each video frame j encountered with $a_j$=0, meaning this frame is already marked for omission. So if the read frame has been marked for dropping/omission, the next frame in the TX buffer is then read (step 1014, "yes" branch). If the frame j read is with coding or frame type B. i.e., a B-frame (step 1020), the CPG process marks frame j for omission, e.g., by setting $a_j$=0 (step 1024), and returns the new candidate pattern to the calling procedure (e.g., step 950 of FIG. 9B), and an indication that potentially more patterns may further be generated, if appropriate. In general, the vector $p_m=[a_m, a_{m+1}, a_{m+2}, \ldots, a_{m+L-1}]$ is now returned, where the location of $a_j$ in that vector is now replaced by "0," for example. This exemplary operation in general ensures that all B-frames are marked for omission first before P-frames, and that B-frames are marked for omission in their order in the transmission buffer, i.e., drop/omit earlier B-frames prior to dropping/omitting later B-frames, consistent with Rules 1, 2a, and 3a. Referring back to FIG. 9B, for illustrative purposes, let us assume that there are 16 frames in the TX buffer being processed at time $t_m$ and that the first frame or the frame at the front of the TX buffer is a B-frame, if the first pattern $p_1$ is {1,1,1,1,1,1,1,1,1,1,1,1,1,1,1,1}, the second pattern p2, i.e., the next candidate pattern returned (step 1032) has a pattern, such that p2={0,1,1,1,1,1,1,1,1,1,1,1,1,1,1,1}.

On the other hand, if a frame j read is with coding type P (a P-frame) (step 1028, "yes" branch) and the procedure has not yet encountered or read a P-frame followed by an I-frame (as determined by the state of the FSM) (step 1042, "no" branch), the FSM transitions to (or stays in) the state that indicates that a P-frame has been encountered, e.g., "State =P-Frame Read" (step 1048)—indicating that the CPG process has only at this point only read or encountered P-frames. Also, the index or the location of this P-frame in the transmission buffer is stored, for example, in the FLL and the FCTR is incremented by one, e.g., FCTR=FCTR+1, indicating that an additional frame has been read which is not marked for omission (step 1052). The location of this processed or read P-frame is thus recorded. If a frame j read is with coding type P (a P-frame) (step 1028, "yes" branch) and the procedure has already encountered or read a P-frame followed by an I-frame (as determined by the state of the FSM) (step 1042, "yes" branch), the FSM transitions to (or stays in) the state that indicates that a P-frame has been encountered followed by an I-frame, e.g., by indicating that "State=P & I-Frames Read" (step 1064). If there are more frames to be read (step 1070, "yes" branch), the next frame in the TX buffer is read (step 1008).

On the other hand, if a frame j is encountered with coding type I, i.e., an I-frame (step 1028, "no" branch), a check is made to determine if the FSM state indicates a P-frame had previously been read, e.g., by checking if the State is equal to "P-frame Read" (step 1058). If the CPG determines or if the FSM is in a state where a P-frame has been previously read (step "1058, "yes" branch), the FSM transitions to a state that indicates that a P-frame has been encountered followed by an I-frame, e.g., by indicating that "State=P & I-Frames Read" (step 1064). Otherwise, the CPG checks if the FSM is in a state indicating that a P-frame has been encountered followed by an I-frame (step 1060). If so (step 1060, "yes" branch), the FSM remains in this state, "State=P & I-Frames Read", i.e., the state is not updated. On the other hand, if the FSM is not in a state indicating that a P-frame has been encountered followed by an I-frame (step 1060, "no" branch), the State transitions to a state indicating that only I-frames have been read, e.g., "State=I-Frame Read" (step 1068). The location of the I-frame in the FLL is accordingly updated and the frame counter is accordingly updated (step 1052). The various operations are typically repeated if more frames are still available (step 1070, "yes" branch).

After processing or reading all the frames under consideration in the TX buffer (step 1070, "no" branch, FIG. 10B), the CPG may then check the count of frames that have not been marked for omission. This count, for example, may be based on the frame counter, FCTR. If the FCTR is less than or equal to one or based on other conditions (step 1074), the CPG then is aware than no further frames, e.g., I-or P-frame, may be marked for omission. If the FCTR<=1 (step 1074, "yes" branch), the CPG procedure returns an indication that a new candidate pattern has not been generated and that no further candidate transmission patterns may be generated (step 1090). Otherwise, if the FSM state indicates that one or more P-frame(s) have been encountered followed by an I-frame, e.g., via a check if the "State=P-Frame and I-Frame Read," (step 1080, "yes" branch), the last P-frame read before the first I-frame is then marked for omission, e.g., by setting $a_j$=0, where j is the index of the last P-frame before the I-frame (step 1084). The location of that last P-frame before the first I-frame read may be based from the FLL. The CPG procedure thus returns this new candidate pattern p, typically also with an indication that other candidate patterns may be further generated by the CPG procedure (step 1032). Otherwise (step 1080, "no" branch) the CPG procedure returns an indication that a new candidate pattern has not been generated and that no further candidate transmission patterns may be generated (step 1090). In this embodiment, the CPG process may have only encountered I-frames or only P-frames that are not followed by an I-frame.

The CPG process exemplified in FIGS. 10A and 10B may be modified and be extended to apply to video structures that contain hierarchical B-frames, e.g., data structures which include B-frames with one or more temporal levels (e.g., see FIGS. 4 and 5). In such embodiments, each frame, particularly each B-frame, is associated with an appropriate temporal level, which may be stored, for example, in a temporal level parameter or field. When a frame is inserted into the TX buffer, the temporal level, for example, of that B-frame is accordingly set to the appropriate level. Furthermore, for each temporal level a B-frame counter is set to the number of B-frames at that temporal level. Furthermore, at the start of the CPG process, an initialization operation may be performed determining the maximum temporal level of the frames in the TX buffer.

Looking at FIG. 10A, for example, the CPG process may be modified in general to account for hierarchical B-frames. For example, when a frame j is encountered that is a B-frame, the CPG process first determines if there is any B-frame with a higher temporal level that is not yet marked for omission, by checking the appropriate B-frame counter(s). If there is any B-frame with a higher temporal level available for omission, that read B-frame is skipped and the CPG process in general continues to loop and reads the next frame. On the other-hand, if there is no other B-frame with a higher temporal level, that B-frame is marked for omission, and the CPG returns a new candidate pattern to be applied by the QASS process. The B-frame counter, mentioned in the above paragraph, keeping track of the number of B-frames at this temporal level is also accordingly decremented. Thus, the algorithm of FIGS. 10A and 10B may be applied with some minor variations.

The exemplary CPG algorithm in FIGS. 10A and 10B, for example, may also be extended to generate candidate patterns, according to heuristic rules 1, 2a, and 4a, and for a video stream consisting of I-, P- and conventional non-hierarchical B-frames. The CPG process may be modified, for example, by adding an additional parameter or field associated with frames in the TX buffer, particularly B-frames. When a frame is inserted into the TX buffer, each B-frame is associated with a field indicating the number of consecutive B-frames prior to and including this B-frame. This field is typically reset to zero every time a non-B-frame is encountered. Thus, the location or position of each B-frame in a set or group of consecutive B-frames is appropriately identified. Furthermore, when the CPG process is started, an initialization operation may be performed determining the maximum value of this field, e.g., determining the maximum number of B-frames in each set/group of consecutive B-frames. Furthermore, for each B-frame location/position, a counter is maintained associated with the number of B-frames with that position value in a group of consecutive B-frames.

The exemplary CPG algorithm in FIGS. 10A and 10B, as discussed above may be modified. For example, a check or determination may be made such that if a frame j is encountered that is a B-frame, the CPG process first determines if there is any B-frame with a lower B-frame position that is not yet marked for omission, by checking the above counter(s). If so, the CPG process skips this B-frame and continues to loop and reads the next frame. If there is no B-frame with a lower B-frame position, based also on the appropriate counters mentioned above, that read B-frame is accordingly marked for omission, a new candidate pattern generated, and the appropriate counter(s) accordingly decremented. Using the exemplary CPG algorithm in FIGS. 10A and 10B, variations on the CPG process may be implemented to adapt to the heuristic rules being applied.

In general, the CPG process, in some embodiments, does not have to actually read the actual video frames themselves. A CPG process, for example, needs to know the coding type of the frames, e.g., I-, P-, or B-frame, optionally whether hierarchical or conventional B-frame and/or other key information. This coding and other needed information, however, may be obtained from a metadata or a data structure that may be separate from the actual video frames data itself. This data structure or metadata, for example, may be contained in a separate data structure that may be linked to or be part of the TX buffer itself. The above-mentioned transmission/omission decision variable $a_j$ as well as other auxiliary fields may also be part of this data structure. The metadata fields in this data structure may be separate from the video bit stream and video frame data itself. The data structure, and the metadata fields therein, are updated when video frames are added to or removed from the TX buffer. In some embodiments, it is this data structure that is traversed or read when searching for the target transmission pattern, and not the video bit stream data itself. Thus, when a video frame or a data unit herein is read or encountered, such reading operation may pertain to reading a data structure or metadata associated with the data unit/frame itself and/or the reading of the data unit/frame itself.

Receiver Buffer Management:

As described herein, the exemplary scheduler 214 selects a scheduling pattern such that the transmitted frames are likely to arrive prior to their delivery deadlines, $t_{d,i}$. With reference to FIG. 3, frames 342, 344, 346, 352 that arrive at the receiver are held in a receiver buffer 252, prior to decoding 254 and playout 364. For several reasons, it may be desirable to extend the scheduling algorithm by managing the fullness of this receiver buffer more explicitly. Namely, the robustness of the system may be improved by keeping the receiver buffer filled with data units to a specific desired level, thereby reducing the probability of the receiver buffer underflow.

One of the reasons for controlling receiver buffer fullness is the random nature of the channel. The system estimates future channel behavior based on past observations; however, actual channel behavior may deviate from what is estimated, for example, the throughput may be lower than predicted. When frames arrive just prior to their delivery deadline, this may indicate that the amount of data in the receiver buffer is very low. Even though these data units or frames may be decoded successfully, a small degradation in the channel condition may mean that the receiver buffer is more likely to underflow, considering that the recent decisions by the scheduler did not account for the degradation. In this case, some video frames may now arrive too late. Although the scheduler may be adapted to respond very quickly to changes in the channel condition, for example by simply dropping more frames, the scheduler may not be adapted to control the number of outstanding packets, which have already been sent but have not yet arrived at the receiver/client. The existence of a number of outstanding packets in intermediate buffers outside the control of the scheduler adds to the uncertainty that the system preferably overcomes. Another reason to control the receiver buffer is that in some embodiments, the exemplary QASS considers only a limited number of frames in the TX buffer to reduce computational complexity. Moreover, a real-time live streaming system may only have access to a limited number of frames or data units within a moving time window, and the characteristics of the frames further into the future are not necessarily known.

Figure 11:
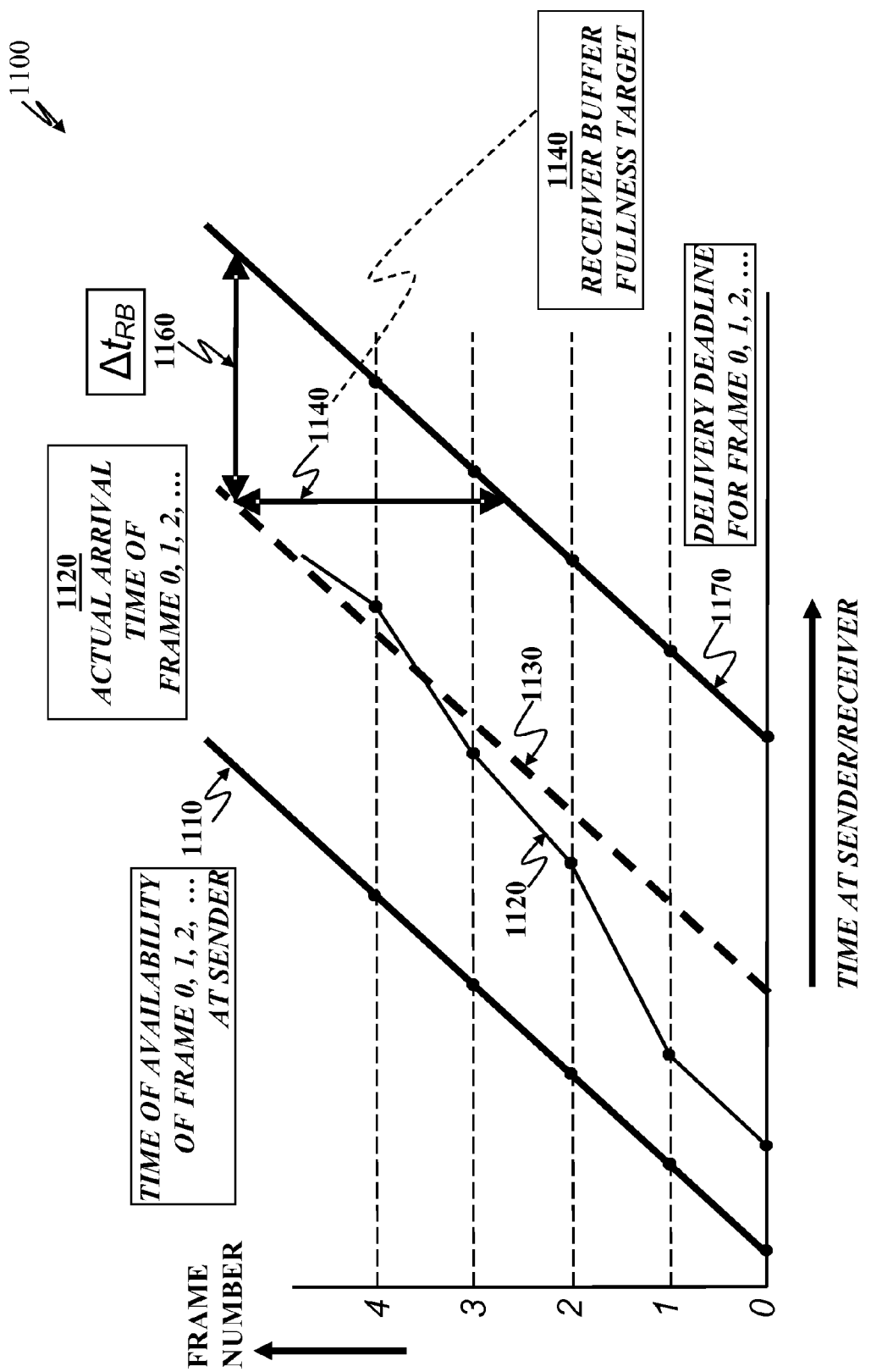
FIG. 11 is an exemplary graph illustrating the timing between actual arrival time and delivery deadline so as to control receiver buffer fullness, according to an embodiment of the invention.

FIG. 11 is a graph 1100 showing exemplary timing relationships, according to embodiments of the invention. In some embodiments, the receiver buffer fullness, i.e., the amount of data maintained at the receiver (RX) buffer 252, may be controlled or influenced by the exemplary QASS system by applying a target delivery deadline that is earlier in time than the actual delivery deadline associated with that data unit. In general, the QASS system applies a receiver buffer fullness target, such that the amount of data in the receiver buffer may be maintained at this target level.

In FIG. 11, the exemplary receiver buffer fullness target 1140 is expressed in the duration of playout of the data units in the RX buffer. The vertical interval between the curve 1120 for actual arrival times and the curve 1170 for delivery deadlines corresponds to the actual amount of data in the receiver buffer, in terms of its duration of playout. By utilizing a target delivery deadline 1130 that is earlier than the actual delivery deadline 1170, the amount of data units in the RX buffer may be controlled. The vertical interval 1140 between the target delivery deadline 1130 and actual delivery deadline 1170 corresponds to the receiver buffer fullness target in terms of duration. The horizontal interval 1160 between the target delivery deadlines 1130 and actual deadlines 1170 corresponds to the buffer fullness control parameter $\Delta t_{RB}$ 1160. The value of this control parameter may be determined by the desired receiver buffer fullness level. This receiver buffer fullness control method may be incorporated in the exemplary QASS process in the scheduler by, for each frame or data unit, subtracting $\Delta t_{RB}$ from the delivery deadline $t_{d,i}$. In other words, the actual or original delivery deadline value is replaced by an earlier target delivery deadline value:

$$t_{d,i} \leftarrow t_{d,i} - \Delta t_{RB} \text{ for frame or data unit } i.$$

Thus, when applying the QASS system, the data units in the TX buffer are each associated (see FIG. 3) and evaluated with this new target delivery deadline adapted to control the receiver buffer fullness. In some embodiments, this feature may be incorporated by reducing, by a fixed amount, the time interval that is available to deliver a sequence of packets that has to be transmitted for a frame to be decoded successfully. In one embodiment, the buffer fullness control parameter $\Delta t_{RB}$ is a constant value and the same value for all frames or data units. In other embodiments, the buffer fullness control parameter may be different for different frames. In some embodiments, the buffer fullness control parameter may change over time, adapting to recent channel conditions. In some embodiments, the buffer fullness control parameter may be selected based on the coding type of a frame or data unit.

In some embodiments, the QASS system may restrict or limit the number of outstanding packets, e.g., packets that have been sent into the network by the server application but have not yet been received by the client application. For example, the system may utilize the technique described in U.S. application Ser. No. 11/113,000 filed on Apr. 21, 2005, entitled "Method for Providing Interactive Television Programming". This U.S. Application Number is herein incorporated in its entirety, including the provisional applications from which it claims priority, for the purpose of restricting or limiting the number of outstanding packets. Other techniques performing the same function, known to those of ordinary skill in the art, may also be applied. For example, the system may wait to send any packets into the channel, until the number of outstanding packets drops below a certain threshold, for example.

Figure 12:
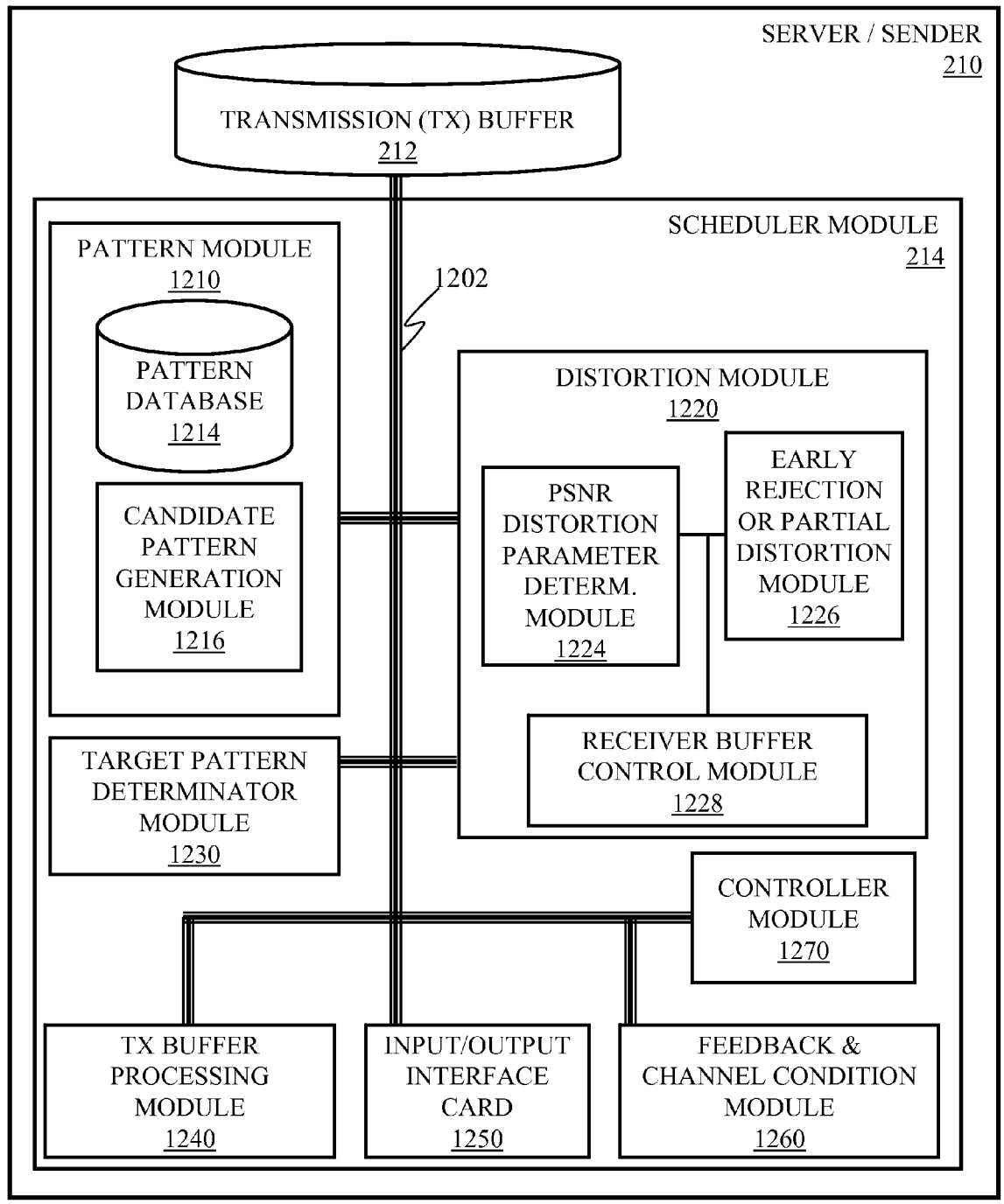
FIG. 12 is an exemplary scheduler adapted to perform the QASS process, according to an embodiment of the present invention.

FIG. 12 is an exemplary sender device 210 of streaming source content adapted to perform the QASS process described herein, according to an embodiment of the invention. The exemplary sender 210 typically includes an input/output I/O interface card 1250 adapted to enable the sender 210 to communicate via the network 240 to one or more receivers 250. The sender 210 may also include a data store, not shown, which may be volatile or non-volatile memory. Such a data store may contain the transmission buffer 212, which typically temporarily stores data units of a source content, e.g., video stream, ready for transmission to one or more receivers 250.

The scheduler module 214 may include other sub-modules, adapted to particularly perform the QASS process described herein. In some embodiments, the various sub-modules interface with each other via a bus, dedicated signal paths or one or more channels 1202. The scheduler 214 may include a pattern module 1210, which is adapted to provide the static or pre-generated and dynamically generated scheduling or transmission/omission patterns described herein, if appropriate. In embodiments where the patterns are stored as tables, for example, the pattern module 1210 may also include a pattern table(s) or list(s) 1214 adapted to store such scheduling patterns 1214. The pattern database 1214 may be local or remote to the scheduler. In other embodiments, the pattern module 1210 provides dynamically generated scheduling patterns via a candidate pattern generation module 1216. The CPG module performs 1216 the exemplary functions described above.

The scheduler may also include a distortion module 1220 adapted to calculate the distortion based on an applied scheduling pattern. Such a distortion module may calculate distortion at the frame level or at the pattern level, as described above. In some embodiments, the distortion module 1220 includes a PSNR distortion parameter determinator module 1224 that is adapted to determine or calculate the appropriate PSNR distortion parameter. In some embodiments, the amount of a priori information stored in terms of PSNR/distortion data is minimized. In other embodiments, the distortion module 1224 dynamically calculates, e.g., some of, the PSNR/distortion parameters. In other cases, some of the PSNR/distortion parameters may come with the video data itself, which is read by the PSNR determinator module 1224. The PSNR determinator module 1224 may also include or interface with a PSNR distortion table or list adapted to store PSNR distortion values, if appropriate. In other embodiments, the distortion module 1220 is adapted to perform the early rejection or partial distortion calculation 1226 as described above to provide for more efficient processing. In other embodiments, the distortion module 1220 is also adapted to determine or calculate the probability that a frame may arrive late at a client, e.g., using Poisson Distribution or Normal (Gaussian) Distribution. In other embodiments, the distortion module 1220 influences the receiver buffer fullness by assigning an earlier target delivery deadline via a receiver buffer control module that may interface with the TX buffer 212 to determine the actual delivery deadline of the data units. The target pattern determinator module 1230 is adapted to determine the target scheduling pattern typically interfacing with other modules. The feedback and channel condition module 1260 is adapted to receive and process feedbacks from one or more receivers and may also in some embodiments determine network conditions based on information the sender has access to or has received. The TX buffer processing module 1240 is adapted to process data units in the TX buffer, for example, transmit the data units in the transmission buffer, particularly the data unit at the start or front of the TX buffer based on the target scheduling pattern determined by the target pattern determinator module 1230. The controller module 1270 is typically adapted to control the overall functions of the sender 210, including for example, triggering at each transmission opportunity a QASS process using one or more modules in the scheduler module 214. In some embodiments, the sender may also include an encoder or codec module, not shown, adapted to encode source contents, particularly, if the sender also performs the encoding process. Depending on the function of the device, other modules, including functions and capabilities, may be added or removed. Furthermore, the modules described herein may be further subdivided and combined with other functions so long as the function and processes described herein may be performed, e.g., the pattern module 1210 may be combined with the target pattern determinator module 1230, or the early rejection or partial distortion module 1226 may be combined with the pattern module 1210. The various modules may also be implemented in hardware, e.g., chips and circuitries, software, or both, i.e., firmware.

One of ordinary skill in the art will appreciate that various software or programming techniques may be applied to perform the process described herein, such as counters, flags, arrays, variables, and the like. Furthermore, embodiments of the present invention may be used in conjunction with networks, systems, and devices that stream source content. Although this invention has been disclosed in the context of certain embodiments and examples, e.g., frames and MPEG data structure, it will be understood by those of ordinary skill in the art that the present invention extends beyond the specifically disclosed embodiments to other alternative embodiments and/or uses of the invention and obvious modifications and equivalents thereof. In addition, while a number of variations of the invention have been shown and described in detail, other modifications, which are within the scope of this invention, will be readily apparent to those of ordinary skill in the art based upon this disclosure. It is also contemplated that various combinations or subcombinations of the specific features and aspects of the embodiments may be made and still fall within the scope of the invention. Accordingly, it should be understood that various features and aspects of the disclosed embodiments can be combined with or substituted for one another in order to form varying modes of the disclosed invention. Thus, it is intended that the scope of the present invention herein disclosed should not be limited by the particular disclosed embodiments described above.

I claim:

1. A method of transmitting between a sender and a receiver, a data stream comprising a plurality of data units in a transmission buffer at the sender, wherein the plurality of data units comprises a first data unit at the front of the transmission buffer and other data units following the first data unit, the method comprising:

applying, by a processing device, a set of evaluation patterns based on at least one pattern-selection rule, wherein the set of evaluation patterns comprises one or more scheduling patterns with each scheduling pattern comprising a plurality of scheduling decisions, each decision associated with a data unit from the plurality of data units in the transmission buffer, and wherein each scheduling decision indicates whether the associated data unit is evaluated for transmission or dropping;

calculating a distortion increase value for each scheduling pattern from the set of evaluation patterns;

determining a target scheduling pattern based on a least calculated distortion value among the calculated distortion increase values from each scheduling pattern from the set of evaluation patterns; and processing the first data unit in the transmission buffer for transmission or dropping based on the decision associated with the first data unit from the determined target scheduling pattern.

2. The method of claim 1, further comprising the steps of: repeating the steps of claim 1 at a next transmission opportunity.

3. The method of claim 1, wherein a number of the one or more scheduling patterns in the set of evaluation patterns is based on available resources at the sender.

4. The method of claim 1, wherein the plurality of data units in the transmission buffer considered is only a portion of data units actually contained in the transmission buffer.

5. The method of claim 4, wherein the plurality of data units considered is determined based on available resources at the sender.

6. The method of claim 4, wherein the plurality of data units considered is determined based on the coding type of the data units contained in the transmission buffer.

7. The method of claim 1, wherein the at least one pattern-selection rule is at least one rule from the following:

transmit all intra-coded data units;

transmit at least one descendant data unit only if all the ancestor data units of the at least one descendant data unit are transmitted;

drop at least one low-temporal-level data unit with a low temporal level only if data units with higher temporal levels higher than the low temporal level of the at least one data unit are dropped;

drop at least one data unit only if data units later in the transmission order are also dropped;

drop at least one co-temporal-level data unit with a temporal level only if data units, earlier in the transmission order, with temporal level equal to the temporal level of the at least one co-temporal-level data unit are also dropped;

drop at least one data unit that is part of a group of consecutive data units—wherein each data unit in the group of consecutive data units have the same temporal level and are immediately next to each other, only if data units from any other groups of consecutive data units with the same temporal level and earlier in the transmission order are also dropped;

drop data units uniformly among groups of consecutive data units, wherein each data unit in each group of consecutive data units have the same temporal level and are immediately next to each other; and drop data units in an increasing manner among groups of consecutive data units, wherein each data unit in each group of consecutive data units have the same temporal level and are immediately next to each other, and wherein the increasing manner relates to how many data units are being dropped.

8. The method of claim 1, wherein the at least one pattern-selection rule is based on at least one of the following:

coding dependencies between different data units in the transmission buffer;

coding types of data units in the transmission buffer;

coding order of data units in the transmission buffer;

display order of data units in the transmission buffer;

transmission order of data units in the transmission buffer;
temporal levels of data units in the transmission buffer.

9. The method of claim 1 wherein the step of calculating the distortion increase value for each scheduling pattern is based on one or more lookups from a peak signal-to-noise ratio (PSNR) parameter table containing a PSNR parameter value for each data unit in a group of picture structure.

10. The method of claim 1 wherein the step of calculating the distortion increase for each scheduling pattern is based on one or more lookups from a peak signal-to-noise ratio (PSNR) parameter table containing a PSNR parameter value for each unique frame coding type in a group of picture structure.

11. The method of claim 1 wherein the step of calculating the distortion increase value for each scheduling pattern is based on a linear function of a logarithm of an input bit rate of the data stream.

12. The method of claim 1 wherein the step of calculating the distortion increase value for each scheduling pattern is based on a probability that one or more data units, each associated with a delivery deadline, are calculated to not arrive at the receiver at the associated delivery deadlines.

13. The method of claim 12 wherein the probability is determined based on at least one model of the following models: a Gaussian distribution model; a Poisson distribution model.

14. The method of claim 13 wherein the model describes the distribution of either:
a number of packets delivered to the receiver within a time interval; or
a number of bytes delivered to the receiver within a time interval.

15. The method of claim 12 wherein the probability is based on a number of bytes comprising the data units transmitted given a scheduling pattern.

16. The method of claim 12 wherein the probability is based on estimating an average of a number of bytes delivered to the receiver within a time interval.

17. The method of claim 16 wherein the probability is further based on estimating a standard deviation of the number of bytes delivered to the receiver within a time interval.

18. The method of claim 17 wherein said estimating is based on a feedback message received by the sender from the receiver.

19. The method of claim 1 wherein the step of determining the target scheduling pattern from the set of evaluation patterns further comprises maintaining an interim minimum distortion variable.

20. The method of claim 19 wherein the step of calculating the distortion increase value for each scheduling pattern further comprises:
calculating a distortion increase at a data unit level for each data unit associated with a scheduling decision in the plurality of scheduling decisions of the scheduling pattern;
accumulating the calculated distortion increase at the data unit level in a temporary variable;
comparing the temporary variable value with the interim minimum distortion variable value; and
if the value of the temporary variable is greater than the interim minimum distortion variable value, then skipping the step of calculating the distortion increase at a data unit level for data units in the scheduling pattern not yet evaluated.

21. The method of claim 1 wherein the step of calculating the distortion increase for each scheduling pattern further comprises calculating and accumulating a distortion increase at a data unit level for each data unit associated with a scheduling decision in the plurality of scheduling decisions of the scheduling pattern.

22. The method of claim 1 wherein the set of evaluation patterns comprising the one or more scheduling patterns are dynamically generated via a set of program instructions.

23. The method of claim 1 wherein the step of calculating the distortion increase value for each scheduling pattern is based on a defined earlier target delivery deadline, earlier in time than a delivery deadline originally associated with each data unit.

24. The method of claim 1 wherein the step of calculating the distortion increase value for each scheduling pattern is based on a receiver buffer fullness parameter.

25. The method of claim 1 wherein the data stream corresponds to a video stream.

26. The method of claim 25 wherein each data unit corresponds to a coded video frame.

27. A device [configured] to be operably connected to a network, the device comprising:
a transmission buffer comprising a data stream, wherein the data stream comprises a plurality of data units, and wherein the plurality of data units comprises a first data unit at the front of the buffer and other data units following the first data unit;
a pattern module [configured] to:
apply a set of evaluation patterns based on at least one pattern-selection rule, wherein the set of evaluation patterns comprises one or more scheduling patterns with each scheduling pattern comprising a plurality of scheduling decisions, each decision associated with a data unit from the plurality of data units in the transmission buffer, and wherein each scheduling decision indicates whether the associated data unit is evaluated for transmission or dropping;
a distortion module [configured] to:
calculate a distortion increase value for each scheduling pattern from the set of evaluation patterns; and
a target pattern determinator module [configured] to:
determine a target scheduling pattern based on a least calculated distortion value among the calculated distortion increase values from each scheduling pattern from the set of evaluation patterns; and
process the first data unit in the transmission buffer for transmission or dropping based on the decision associated with the first data unit from the determined target scheduling pattern.

28. A system comprising:
a first device comprising operably coupled to a second device via one or more network segments, the first device comprising:
a transmission buffer comprising a data stream, wherein the data stream comprises a plurality of data units, and wherein the plurality of data units comprises a first data unit at the front of the buffer and other data units following the first data unit;
a pattern module configured to:
apply a set of evaluation patterns based on at least one pattern-selection rule, wherein the set of evaluation patterns comprises one or more scheduling patterns with each scheduling pattern comprising a plurality of scheduling decisions, each decision associated with a data unit from the plurality of data units in the transmission buffer, and wherein each scheduling decision indicates whether the associated data unit is evaluated for transmission or dropping;

a distortion module configured to:
  calculate a distortion increase value for each scheduling pattern from the set of evaluation patterns; and
a target pattern determinator module configured to:
  determine a target scheduling pattern based on a least calculated distortion value among the calculated distortion increase values from each scheduling pattern from the set of evaluation patterns; and
  process the first data unit in the transmission buffer for transmission or dropping based on the decision associated with the first data unit from the determined target scheduling pattern;
the second device configured to:
  receive data units transmitted by the first device, wherein the data units received by the second device include data units from the transmission buffer processed for transmission by the first device; and
the one or more network segments.

* * * * *